United States Patent
Jung et al.

(10) Patent No.: US 9,625,267 B2
(45) Date of Patent: Apr. 18, 2017

(54) IMAGE DISPLAY APPARATUS AND OPERATING METHOD OF IMAGE DISPLAY APPARATUS

(71) Applicant: LG ELECTRONICS INC., Seoul (KR)

(72) Inventors: Dukyung Jung, Seoul (KR); Kwangjae Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/892,023

(22) PCT Filed: Mar. 18, 2014

(86) PCT No.: PCT/KR2014/002268
§ 371 (c)(1),
(2) Date: Nov. 18, 2015

(87) PCT Pub. No.: WO2014/189200
PCT Pub. Date: Nov. 27, 2014

(65) Prior Publication Data
US 2016/0097651 A1   Apr. 7, 2016

(30) Foreign Application Priority Data
May 21, 2013  (KR) .......................... 10-2013-0057322

(51) Int. Cl.
*G01C 21/36* (2006.01)
*H04W 4/02* (2009.01)
(Continued)

(52) U.S. Cl.
CPC ......... *G01C 21/362* (2013.01); *G01C 21/367* (2013.01); *G01C 21/3667* (2013.01);
(Continued)

(58) Field of Classification Search
None
See application file for complete search history.

(56) References Cited

U.S. PATENT DOCUMENTS

2003/0177020 A1* 9/2003 Okamura ............... G06Q 10/02
  705/5
2006/0129316 A1* 6/2006 Park ....................... G01C 21/36
  701/431
(Continued)

FOREIGN PATENT DOCUMENTS

JP        2007-33220 A        2/2007
JP        2013108915 A  *     6/2013
(Continued)

OTHER PUBLICATIONS

JP 2013-108915 EPO Machine translation, Nov. 19, 2016.*

*Primary Examiner* — Fadey Jabr
*Assistant Examiner* — Kevin P Mahne
(74) *Attorney, Agent, or Firm* — Birch, Stewart, Kolasch & Birch, LLP

(57) ABSTRACT

Disclosed are a mobile terminal and a control method thereof. Embodiments according to the present invention comprise: a display unit for outputting a first map screen; a communication unit for accessing at least one external device and receiving location data related to the first map screen selected on a second map screen output by the external device; and a control unit for determining a geographical location corresponding to the selected location data, calculating coordinate values of the first map screen corresponding to the determined geographical location and displaying the calculated coordinate values on the first map screen, and outputting a request signal for setting the determined geographical location as at least one of a destination and a waypoint of a vehicle.

19 Claims, 16 Drawing Sheets

(51) Int. Cl.
*G06F 3/0488* (2013.01)
*G08G 1/0968* (2006.01)
*G08G 1/0969* (2006.01)
*H04W 92/18* (2009.01)

(52) U.S. Cl.
CPC ..... *G01C 21/3679* (2013.01); *G01C 21/3682* (2013.01); *G06F 3/0488* (2013.01); *G06F 3/04883* (2013.01); *G08G 1/0969* (2013.01); *G08G 1/096811* (2013.01); *H04W 4/02* (2013.01); *G01C 21/3632* (2013.01); *G09G 2360/06* (2013.01); *H04W 92/18* (2013.01)

(56) References Cited

U.S. PATENT DOCUMENTS

| | | | | |
|---|---|---|---|---|
| 2008/0139181 | A1* | 6/2008 | Lokshin | G06Q 30/02 455/414.1 |
| 2009/0098888 | A1 | 4/2009 | Yoon | |
| 2010/0019990 | A1* | 1/2010 | Lee | G01C 21/362 345/2.2 |
| 2010/0295803 | A1* | 11/2010 | Kim | G06F 3/0488 345/173 |
| 2011/0264369 | A1* | 10/2011 | Chang | G01C 21/3688 701/533 |
| 2013/0169526 | A1* | 7/2013 | Gai | H04W 4/008 345/156 |
| 2013/0335273 | A1* | 12/2013 | Pakzad | G01C 21/206 342/458 |
| 2014/0074757 | A1* | 3/2014 | De Gennaro | G07B 13/04 705/417 |
| 2014/0277843 | A1* | 9/2014 | Langlois | H04M 1/6091 701/2 |
| 2014/0350978 | A1* | 11/2014 | Li | G06F 3/04842 705/5 |
| 2015/0032366 | A1* | 1/2015 | Man | H04W 4/046 701/412 |

FOREIGN PATENT DOCUMENTS

| | | |
|---|---|---|
| KR | 10-2009-0038195 A | 4/2009 |
| KR | 10-2010-0079091 A | 7/2010 |
| KR | 10-2012-0025359 A | 3/2012 |
| KR | 10-1218293 B1 | 1/2013 |

* cited by examiner

IMAGE DISPLAY APPARATUS AND OPERATING METHOD OF IMAGE DISPLAY APPARATUS

CROSS REFERENCE TO RELATED APPLICATIONS

This application is the National Phase of PCT International Application No. PCT/KR2014/002268, filed on Mar. 18, 2014, which claims priority under 35 U.S.C. §119(a) to Korean Patent Application No. 10-2013-0057322, filed on May 21, 2013, all of which are hereby expressly incorporated by reference into the present application.

TECHNICAL FIELD

The present disclosure relates to an image display apparatus and an operating method thereof, and more particularly, an image display apparatus capable of accessing an external device, and an operating method thereof.

BACKGROUND ART

An image display apparatus is an apparatus having a function of outputting user-viewable images and sounds. The user can watch various images in a vehicle through the image display apparatus that is mounted in the vehicle in a fixed or detachable manner.

Also, the image display apparatus may be mounted in the vehicle to provide a user with a driving path (or a travel route) from a current location of the vehicle to a destination and traffic information using global positioning system (GPS) signals.

The image display apparatus may also be connected to an external device through an external terminal and the like. When the image display apparatus is connected to the external device, the image display apparatus may receive information related to a driving path, traffic information and the like of the vehicle through the connected external device.

However, the image display apparatus within the vehicle generally has a different vendor from the external device, and a direct control of the image display apparatus (specifically, a navigator) by the external device during driving may be dangerous. Therefore, a method is required for outputting a driving path or a destination/waypoint of the vehicle on the image display apparatus through the external device, for a fast search for a desired destination without an interference with the user's driving.

DISCLOSURE OF THE INVENTION

Therefore, an aspect of the detailed description is to provide an image display apparatus, capable of receiving a recommended destination/waypoint or a driving path of a vehicle through the image display apparatus with a navigation function and an external device connected to the image display apparatus, and an operating method thereof.

Another aspect of the detailed description is to provide an image display apparatus capable of setting or changing a destination/waypoint or a driving path of a vehicle in a manner of transmitting and receiving a shape or figure drawn along a touch applied to map data by sharing the map data with a connected (or accessed) external device or using different map data from the external device.

Another aspect of the detailed description is to provide an image display apparatus, capable of simultaneously displaying representative images indicating current locations of a plurality of vehicles, respectively, on one map data, and simultaneously setting or changing destinations of the plurality of vehicles based on a touch input applied to the map data.

To achieve these and other advantages and in accordance with the purpose of the present invention, as embodied and broadly described herein, there is provided an image display apparatus including a display unit configured to output a first map screen, a communication unit configured to access at least one external device and receive location data of the first map screen selected from a second map screen output on the external device, and a controller configured to determine (decide) a geographical location corresponding to the selected location data, calculate coordinate values of the first map screen corresponding to the determined geographical location to output on the first map screen, and output a request signal for setting the determined geographical location as at least one of a destination or a waypoint of a vehicle.

In one exemplary embodiment, the controller may generate road guide information including the coordinate values as one of the destination and the waypoint based on a select signal responsive to the request signal, and output an indicator corresponding to the generated road guide information on the first map screen.

In one exemplary embodiment, the controller may determine a point of interest (POI) that matches the location data as the geographical location when the matched POI is searched for.

In one exemplary embodiment, the controller may determine an estimated location as the geographical location when the POI that matches the location data is not searched for, and the estimated location may be obtained based on global positioning system (GPS) information included in the location data.

In one exemplary embodiment, the controller may transmit a request message for sharing the first map screen to the accessed external device, and transmit the first map screen to the external device when a response signal is received from the accessed external device.

In one exemplary embodiment, when information related to a line drawn on the transmitted first map screen is received from the external device, the controller may control the line corresponding to the received information to be output in real time even on the first map screen output on the display unit.

In one exemplary embodiment, when motion information related to the transmitted first map screen is received from the external device, the controller may change an output range of the first map screen output on the display unit to correspond to the received motion information.

In one exemplary embodiment, the controller may provide information related to a touch input applied to the first map screen such that a line drawn along the touch input is also output on the first map screen transmitted to the external device. The controller may control the communication unit to provide information related to an inclination applied to the display unit, to change an output range of the first map screen according to degree and direction of the inclination.

In one exemplary embodiment, when the line drawn along the touch input forms one line connected from a first location corresponding to a current location of the vehicle to a second location and thereafter a preset input signal is detected, the controller may search for road guide information which provides the line formed from the first location to the second location as a travel route.

In one exemplary embodiment, when the line drawn along the touch input has a first shape, the controller may generate a first control command for selecting a location corresponding to a drawn point of the line. When a line of a second shape is drawn along the touch input at the drawn point of the line with the first shape, the controller may generate a second control command for deselecting the location corresponding to the drawn point of the line.

In one exemplary embodiment, the controller may output road guide information with the selected location as one of the destination and the waypoint when the first control command is generated and an input of a preset response signal is detected. The controller may change the road guide information to a previously-set destination or waypoint when the second control command is generated and an input of a preset response signal is detected.

In one exemplary embodiment, the display unit may simultaneously output a plurality of representative images, which indicate current locations of a first vehicle connected to the image display apparatus and a second vehicle connected with the accessed external device, respectively, on the first map screen. The controller may control destination information related to a vehicle corresponding to each representative image to be displayed, and control the destination information to be output along a movement of the representative image, in response to the representative image corresponding to each vehicle being moved.

In one exemplary embodiment, in response to a preset touch being applied to the representative image and a line of a first shape being drawn at one point of the first map screen on a master image display apparatus, the controller may output a request signal for changing the destination of the vehicle corresponding to the touch-applied representative image into a location corresponding to the one point of the first map screen.

In one exemplary embodiment, when a select signal responsive to the request signal is detected, the controller may change the destination of the vehicle corresponding to the touch-applied representative image to the location corresponding to the one point, and control the changed destination information to be output at the corresponding representative image.

An operating method of an image display apparatus according to an embodiment of the present invention may include outputting a first map screen, accessing at least one external device and receiving location data associated with the first map screen selected from a second map screen output on the external device, determining a geographical location corresponding to the received location data, calculating coordinate values of the first map screen corresponding to the determined geographical location and outputting the calculated coordinate values on the first map screen, and outputting a request signal for setting the determined geographical location as at least one of a destination and a waypoint.

In one exemplary embodiment, the method may further include receiving a select signal corresponding to the request signal, and generating road guide information corresponding to the received select signal and outputting the generated road guide information on the first map screen.

In one exemplary embodiment, the method may further include determining a point of interest (POI) that matches the location data when the matched POI is searched for, and determining an estimated location as the geographical location when the POI matching the location data is not searched for, the estimated location obtained based on global positioning system (GPS) information included in the location data.

In one exemplary embodiment, the method may further include transmitting a request message for sharing the first map screen to the accessed external device and transmitting the first map screen to the accessed external device when a response message is received from the accessed external device, and outputting, when information related to a line drawn at the transmitted first map screen is received from the accessed external device, the line corresponding to the received information even on the first map screen.

In one exemplary embodiment, the method may further include providing information related to a touch input applied to the first map screen to the external device such that a line drawn along the touch input applied to the first map screen is also output on the first map screen transmitted to the external device, and providing information related to an inclination applied to a main body of the image display apparatus to the external device such that an output range of the first map screen is changed according to degree and direction of the applied inclination.

In one exemplary embodiment, the method may further include simultaneously outputting a plurality of representative images, which indicate current locations of a first vehicle connected with the image display apparatus and a second vehicle connected with the accessed external device, respectively, on the first map screen, and controlling destination information related to the vehicle corresponding to each representative image to be output along a movement of the representative image corresponding to each vehicle, in response to the representative image corresponding to each vehicle being moved.

Advantageous Effect

In an image display apparatus and an operating method thereof according to embodiments of the present invention, a destination/waypoint or a travel route of a vehicle can be set or changed merely by a driver's approval by being provided through an external device connected with the image display apparatus. This may allow for fast searching for the destination/waypoint or travel route without an interference with the driving of the driver, resulting in enhancement of convenience in use.

In an image display apparatus and an operating method thereof according to embodiments of the present invention, by sharing map data with the external device connected with the image display apparatus or using different map data from the connected external device, a shape or pattern drawn along a touch applied to the corresponding map data can be transmitted and received to set or change the destination/waypoint or the travel route of the vehicle, thereby providing intuitive interfaces to a user.

Also, in an image display apparatus and an operating method thereof according to embodiments of the present invention, current locations and moving paths of a plurality of vehicles can be simultaneously recognized on one screen, and the moving paths or destinations of the plurality of vehicles can simultaneously be recommended based on a touch input applied to the screen.

MODES FOR CARRYING OUT THE PREFERRED EMBODIMENTS

Figure 1:
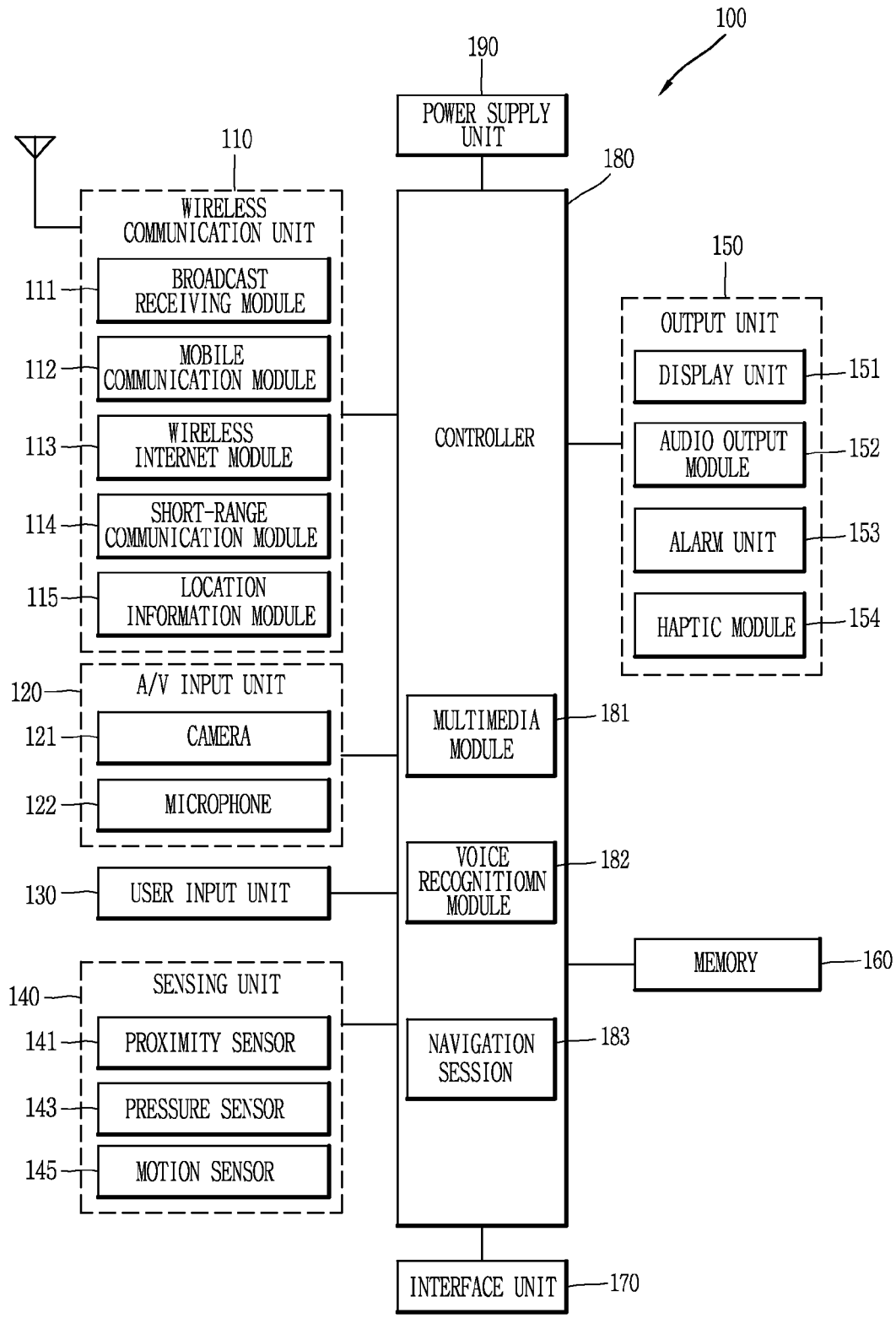
FIG. 1 is a view illustrating a configuration of an example of an external device accessing an image display apparatus in accordance with one exemplary embodiment of the present invention.

It should be noted that technological terms used herein are merely used to describe a specific embodiment, but not to limit the present disclosure. Also, unless particularly defined otherwise, technological terms used herein should be construed as a meaning that is generally understood by those having ordinary skill in the art to which the invention pertains, and should not be construed too broadly or too narrowly. Furthermore, if technological terms used herein are wrong terms unable to correctly express the spirit of the invention, then they should be replaced by technological terms that are properly understood by those skilled in the art. In addition, general terms used in this invention should be construed based on the definition of dictionary, or the context, and should not be construed too broadly or too narrowly.

Incidentally, unless clearly used otherwise, expressions in the singular number include a plural meaning. In this application, the terms "comprising" and "including" should not be construed to necessarily include all of the elements or steps disclosed herein, and should be construed not to include some of the elements or steps thereof, or should be construed to further include additional elements or steps.

Also, a suffix such as "module" and "unit" may be used to refer to elements or components. Use of such a suffix herein is merely intended to facilitate description of the specification, and the suffix itself is not intended to give any special meaning or function.

Furthermore, the terms including an ordinal number such as first, second, etc. can be used to describe various elements, but the elements should not be limited by those terms. The terms are used merely for the purpose to distinguish an element from the other element. For example, a first element may be named to a second element, and similarly, a second element may be named to a first element without departing from the scope of right of the invention.

Hereinafter, preferred embodiments of the present invention will be described in detail with reference to the accompanying drawings, and the same or similar elements are designated with the same numeral references regardless of the numerals in the drawings and their redundant description will be omitted.

In describing the present disclosure, moreover, the detailed description will be omitted when a specific description for publicly known technologies to which the invention pertains is judged to obscure the gist of the present disclosure. Also, it should be noted that the accompanying drawings are merely illustrated to easily explain the spirit of the invention, and therefore, they should not be construed to limit the spirit of the invention by the accompanying drawings.

Examples of electronic devices include cellular phones, smart phones, laptop computers, digital broadcast terminals, personal digital assistants (PDAs), portable multimedia players (PMPs), navigators, slate PCs, tablet PCs, ultra books, and the like.

As illustrated in FIG. 1, an electronic device 100 may be shown having components such as a wireless communication unit 110, an audio/video (AN) input unit 120, a user input unit 130, a sensing unit 140, an output unit 150, a memory 160, an interface unit 170, a controller 180, and a power supply unit 190. It may be understood that implementing all of the illustrated components is not a requirement, and that greater or fewer components may alternatively be implemented.

The wireless communication unit 110 may include one or more modules which permit wireless communications between the external device 100 and a wireless communication system, communications between the external device 100 and a network in which the external device 100 is located, or the like. The wireless communication unit 110, for example, may include one or more of a broadcast receiving module 111, a mobile communication module 112, a wireless Internet module 113, a short-range communication module 114, and a location information module 115.

The broadcast receiving module 111 receives a broadcast signal and/or broadcast associated information from an external broadcast managing entity via a broadcast channel.

The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information related to a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112. The broadcast associated information may exist in various forms. For example, it may exist in the form of an electronic program guide (EPG) of a digital multimedia broadcasting (DMB) system, an electronic service guide (ESG) of a digital video broadcast-handheld (DVB-H) system, and the like.

The broadcast receiving module 111 may receive a digital broadcast by using a digital broadcast system such as a multimedia broadcasting-terrestrial (DMB-T) system, a digital multimedia broadcasting-satellite (DMB-S) system, a data broadcasting system such as media forward link only (MediaFLO®), a digital video broadcast-handheld (DVB-H) system, integrated services digital broadcast-terrestrial (ISDB-T), etc. The broadcast receiving module 111 may be configured to be suitable for additional broadcast systems that provide a broadcast signal as well as the above-mentioned digital broadcast systems. Broadcast signals and/or broadcast-associated information received via the broadcast receiving module 111 may be stored in the memory 160.

The mobile communication module 112 may transmit/receive wireless signals to/from at least one of network entities (e.g., base station, an external terminal, a server, etc.) on a mobile communication network. Here, the wireless signals may include audio call signal, video call signal, or various formats of data according to transmission/reception of text/multimedia messages.

The wireless internet module 113 may support wireless Internet access for the terminal. This module may be internally or externally coupled to the mobile terminal. Examples of such wireless Internet access may include Wireless LAN (WLAN), Wi-Fi, Wireless Broadband (Wibro), World Interoperability for Microwave Access (Wimax), High Speed Downlink Packet Access (HSDPA), and the like.

The short-range communication module 114 denotes a module for short-range communications. Suitable technologies for implementing this module may include BLUETOOTH, Radio Frequency IDentification (RFID), Infrared Data Association (IrDA), Ultra-WideBand (UWB), ZigBee, Wireless LAN (Bluetooth, protocols 802.11n, etc.).

The location information module 115 denotes a module for detecting or calculating a location of the terminal. An example of the location information module 115 may include a Global Position System (GPS) module. The GPS module receives location information from a plurality of satellites. Here, the location information may include coordinate information represented by latitude and longitude values. For example, the GPS module may measure an accurate time and distance from three or more satellites, and accurately calculate a current location of the mobile communication terminal according to trigonometry on the basis of the measured time and distances. A method of acquiring distance and time information from three satellites and performing error correction with a single satellite may be used. In particular, the GPS module may acquire an accurate time together with three-dimensional speed information as well as the location of the latitude, longitude and altitude values from the location information received from the satellites. As the location information module 115, a Wi-Fi position system and/or a hybrid positioning system may be used.

The A/V input unit 120 is configured to provide audio or video signal input to the terminal. The AN input unit 120 may include a camera 121 and a microphone 122.

The camera 121 receives and processes image frames of still pictures or video obtained by image sensors in a video call mode or a capturing mode. The processed image frames may be displayed on a display 151.

The image frames processed by the camera 121 may be stored in the memory 160 or transmitted to the exterior via the wireless communication unit 110. Two or more cameras 121 may be provided according to the configuration of the terminal.

The microphone 122 may receive an external audio signal via a microphone while the terminal is in a particular mode, such as a phone call mode, a recording mode, a voice recognition mode, or the like. This audio signal is processed into electric audio data. The processed digital data is converted for output into a format transmittable to a mobile communication base station via the mobile communication module 112 in case of the phone call mode. The microphone 122 may include assorted noise removing algorithms to remove noise generated in the course of receiving the external audio signal.

The user input unit 130 may generate input data inputted by a user to control the operation of the terminal. The user input unit 130 may include a keypad, a dome switch, a touchpad (e.g., static pressure/capacitance), a jog wheel, a jog switch and the like. In particular, when the touch pad is overlaid on the display unit 151 in a layered manner, it may form a touch screen.

The sensing unit 140 (or other detection means) detects a current status (or state) of the electronic device 100 such as an opened or closed state of the electronic device 100, a location of the mobile communication external device 100, the presence or absence of user contact with the electronic device 100 (i.e., touch inputs), the orientation of the electronic device 100, an acceleration or deceleration movement and direction of the electronic device 100, etc., and generates sensing signals for controlling the operation of the electronic device 100. For example, when the electronic device 100 is implemented as a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device.

The sensing unit 140 may include a proximity sensor 141, a pressure sensor 143, a motion sensor 145, and the like.

The proximity sensor 141 may detect presence or absence of an object approaching the electronic device 100 or an object existing near the electronic device 100 without a mechanical contact. The proximity sensor 141 may detect an approaching object by using a change in an AC magnetic field or a static magnetic field, or a variation rate of capacitance. Two or more proximity sensors 141 may be provided according to the aspect of configuration.

The pressure sensor 143 may detect whether or not pressure is applied to the electronic device 100, a size of the pressure, and the like. The pressure sensor 143 may be provided at a portion where the detection of pressure is required in the electronic device 100 according to the use environment. When the pressure sensor 143 is provided in the display unit 151, it may be possible to identify a touch input through the display unit 151 and a pressure touch input by which pressure larger than the touch input is applied according to a signal outputted from the pressure sensor 143. Furthermore, it may be possible to know a size of the pressure applied to the display unit 151 during the input of a pressure touch.

The motion sensor 145 detects the location or movement of the electronic device 100 using an acceleration sensor, a gyro sensor, and the like. The acceleration sensor used in the motion sensor 145 is an element for converting an acceleration change in any one direction into an electrical signal. The motion sensor 145 is widely used in relation to the development of a micro-electromechanical systems (MEMS) technology.

Here, there are various types of acceleration sensors, starting from a type of acceleration sensor which is embedded in an airbag system of a vehicle to measure a great acceleration value which is used for sensing collision to a type of acceleration sensor which recognizes a minute motion of a human hand so as to measure a minute acceleration value used as an input unit for a game or the like. The acceleration sensor is typically configured by providing two or three axes into one package, and if necessary, uses only Z-axis depending on a usage environment. Therefore, when an acceleration sensor in the X-axis or Y-axis, other than the Z-axis, has to be used for some reason or other, an acceleration sensor may be installed by being erected on a main substrate using a separate piece of substrate. The gyro sensor is a sensor of measuring angular velocity, and may sense a turned direction from a reference direction.

The output unit 150 is typically configured to output various types of information, such as audio, video, alarm, and the like. The output unit 150 is shown having a display unit 151, an audio output module 152, an alarm unit 153, a haptic module 154 and the like.

The display unit 151 may output information processed in the electronic device 100. For example, when the electronic device 100 is operating in a phone call mode, the display unit 151 may provide a User Interface (UI) or a Graphic User Interface (GUI), which includes information associated with the call. As another example, if the electronic device is in a video call mode or a capture mode, the display unit 151 may additionally or alternatively display images captured and/or received, UI, or GUI.

The display unit 151 may be implemented using, for example, at least one of a Liquid Crystal Display (LCD), a Thin Film Transistor-Liquid Crystal Display (TFT-LCD), an Organic Light-Emitting Diode (OLED), a flexible display, a three-dimensional (3D) display, and the like. The display unit 151 may be implemented in two or more in number according to a configured aspect of the electronic device 100. For instance, the electronic device 100 may be provided simultaneously with both of an external display unit (not illustrated) and an internal display unit (not illustrated).

Here, if the display unit 151 and a touch sensitive sensor (referred to as a 'touch sensor') have a layered structure therebetween (referred to as a 'touch screen'), the display unit 151 may be used as an input device as well as an output device. The touch sensor may be implemented as a touch film, a touch sheet, a touchpad, and the like.

The touch sensor may be configured to convert changes of pressure applied to a specific part of the display unit 151 or changes of capacitance occurring from a specific part of the display unit 151, into electric input signals. Also, the touch sensor may be configured to sense not only a touched position and a touched area, but also touch pressure. When touch inputs are sensed by the touch sensors, corresponding signals may be transmitted to a touch controller (not illustrated). The touch controller may process the received signals, and then transmit corresponding data to the controller 180. Accordingly, the controller 180 may sense which region of the display unit 151 has been touched.

The proximity sensor 141 may be arranged at an inner region of the electronic device covered by the touch screen, or near the touch screen. The proximity sensor 141 refers to a sensor to sense presence or absence of an object approaching to a surface to be sensed, or an object disposed near a surface to be sensed, by using an electromagnetic field or infrared rays without a mechanical contact. The proximity sensor 141 may have a longer lifespan and a more enhanced utility than a contact sensor.

The proximity sensor 141 may include a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and so on. When the touch screen is implemented as a capacitance type, proximity of a pointer to the touch screen may be sensed by changes of an electromagnetic field. In this case, the touch screen (touch sensor) may be categorized into a proximity sensor 141.

Hereinafter, for the sake of brief explanation, a status that the pointer is positioned to be proximate onto the touch screen without contact will be referred to as 'proximity touch', whereas a status that the pointer substantially comes in contact with the touch screen will be referred to as 'contact touch'. For the position corresponding to the proximity touch of the pointer on the touch screen, such position will correspond to a position where the pointer faces perpendicular to the touch screen upon the proximity touch of the pointer.

The proximity sensor 141 may sense proximity touch, and proximity touch patterns (e.g., distance, direction, speed, time, position, moving status, etc.). Information relating to the sensed proximity touch and the sensed proximity touch patterns may be output onto the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible output signals related to a particular function (e.g., a call signal reception sound, a message reception sound, etc.) performed by the electronic device 100. The audio output module 152 may include a receiver, a speaker, a buzzer or the like.

The alarm unit 153 may output a signal for informing about an occurrence of an event of the electronic device 100. Events generated in the electronic device, for example, may include call signal reception, message reception, key signal inputs, a touch input, etc. In addition to video or audio signals, the alarm unit 153 may output signals in a different manner, for example, using vibration to inform of an occurrence of an event. For example, the alarm unit 153 may output a signal in a vibrating manner. When a call signal or a message is received, the alarm unit 153 may vibrate the electronic device through a vibration means to notify the reception. Or, when a key signal is input, the alarm unit 153 may vibrate the electronic device 100 through the vibration means as a feedback with respect to the key signal input. The vibration may allow the user to recognize the event generation. Of course, signals for notifying the event generation may also be output via the display unit 151 and the audio output module 152.

A haptic module 154 may generate various tactile effects that user may feel. A typical example of the tactile effect generated by the haptic module 155 is vibration. Strength, pattern and the like of the vibration generated by the haptic module 154 may be controllable. For example, different vibrations may be combined to be outputted or sequentially outputted.

Besides vibration, the haptic module 154 may generate various other tactile effects, including an effect by stimulation such as a pin arrangement vertically moving with respect to a contact skin, a spray force or suction force of air through a jet orifice or a suction opening, a touch on the skin, a contact of an electrode, electrostatic force, etc., an effect by reproducing the sense of cold and warmth using an element that can absorb or generate heat, and the like.

The haptic module 154 may be implemented to allow the user to feel a tactile effect through a muscle sensation such as the user's fingers or arm, as well as transferring the tactile effect through a direct contact. The haptic module 154 may be provided by two or more according to a configured aspect of a telematics terminal. The haptic module 154 may be provided at a place of frequently coming in contact with a user in a vehicle, for example, a steering wheel, a gear lever, a seat and the like.

The memory 160 may store programs used for operations performed by the controller, or may temporarily store input and/or output data (for example, a phonebook, messages, still images, video, etc.).

The memory 160 may include at least one type of storage medium including a Flash memory type, a hard disk type, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the electronic device 100 may be operated in relation to a web storage device that performs the storage function of the memory 160 over the Internet.

The interface unit 170 may serve as an interface with every external device connected with the electronic device 100. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like. The identification module may be a chip that stores various information for authenticating authority of using the electronic device 100 and may include a user identity module (UIM), a subscriber identity module (SIM), a universal subscriber identity module (USIM), and the like. In addition, the device having the identification module (referred to as 'identifying device', hereinafter) may take the form of a smart card. Accordingly, the identifying device may be connected with the electronic device 100 via a port. The interface unit 170 may receive data transmitted from an external device, receive power to transfer to each element within the electronic device 100, or transmit internal data of the electronic device 100 to an external device.

When the electronic device 100 is connected with an external cradle, the interface unit 170 may serve as a passage to allow power from the cradle to be supplied to the electronic device 100 therethrough or may serve as a passage to allow various command signals input by the user from the cradle to be transferred to the electronic device therethrough. Various command signals or power input from the cradle may operate as signals for recognizing that the electronic device is properly mounted on the cradle.

The controller 180 may typically control the general operations of the electronic device 100. For example, the controller 180 may perform controlling and processing associated with voice calls, data communications, video calls, and the like. The controller 180 may include a multimedia module 181 for playbacking multimedia data. The multimedia module 181 may be configured within the controller 180 or may be configured to be separated from the controller 180.

The controller 180 may perform pattern recognition processing to recognize a handwriting input or a picture drawing input performed on the touch screen as characters and images, respectively.

The power supply unit 190 may receive external power or internal power and supply appropriate power required for operating respective elements and components under the control of the controller 180.

Various embodiments described herein may be implemented in a computer-readable or its similar medium using, for example, software, hardware, or any combination thereof. For hardware implementation, the embodiments described herein may be implemented by using at least one of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, microprocessors, and electronic units designed to perform the functions described herein. In some cases, such embodiments may be implemented by the controller 180 itself. For software implementation, the embodiments such as procedures or functions described herein may be implemented by separate software modules. Software codes can be implemented by a software application written in any suitable programming language. The software codes may be stored in the memory 160 and executed by the controller 180.

The voice recognition module 182 recognizes a user's voice, and executes a corresponding function according to the recognized voice signal.

A navigation session (or a search unit) 300 applied to the electronic device 100 outputs a driving path on map data.

Meanwhile, the electronic device 100 according to an embodiment of the present invention may search for a destination or a waypoint of a vehicle, for example, using a multimedia module 181, and transmit the searched destination or waypoint by communication with an image display apparatus within the vehicle, which will be explained hereinafter, through the wireless communication unit 110.

Also, the electronic device 100 may receive information related to the vehicle provided from the image display apparatus within the vehicle, which will be explained hereinafter, through the wireless communication unit 110. For example, the image display apparatus within the vehicle may provide information related to the vehicle, such as velocity of the vehicle, a gear state and the like, control a turn-on/off of an emergency light of the vehicle, control a turn-on/off of a headlight, determine whether or not a passenger has seated through a detection sensor disposed on a seat within the vehicle, or control blowing of a horn.

The electronic device 100 may transmit a driving path (travel route or route) along with the searched destination or waypoint to the image display apparatus within the vehicle.

Accordingly, the image display apparatus within the vehicle may output the driving path on a display, a dashboard of the vehicle, a head-up display (HUD) or a front glass of the vehicle using a projector. Here, the HUD may be mounted on the dashboard of the vehicle. Generally-known types of HUD and projector may be used herein, so detailed description thereof will be omitted.

Figure 2:
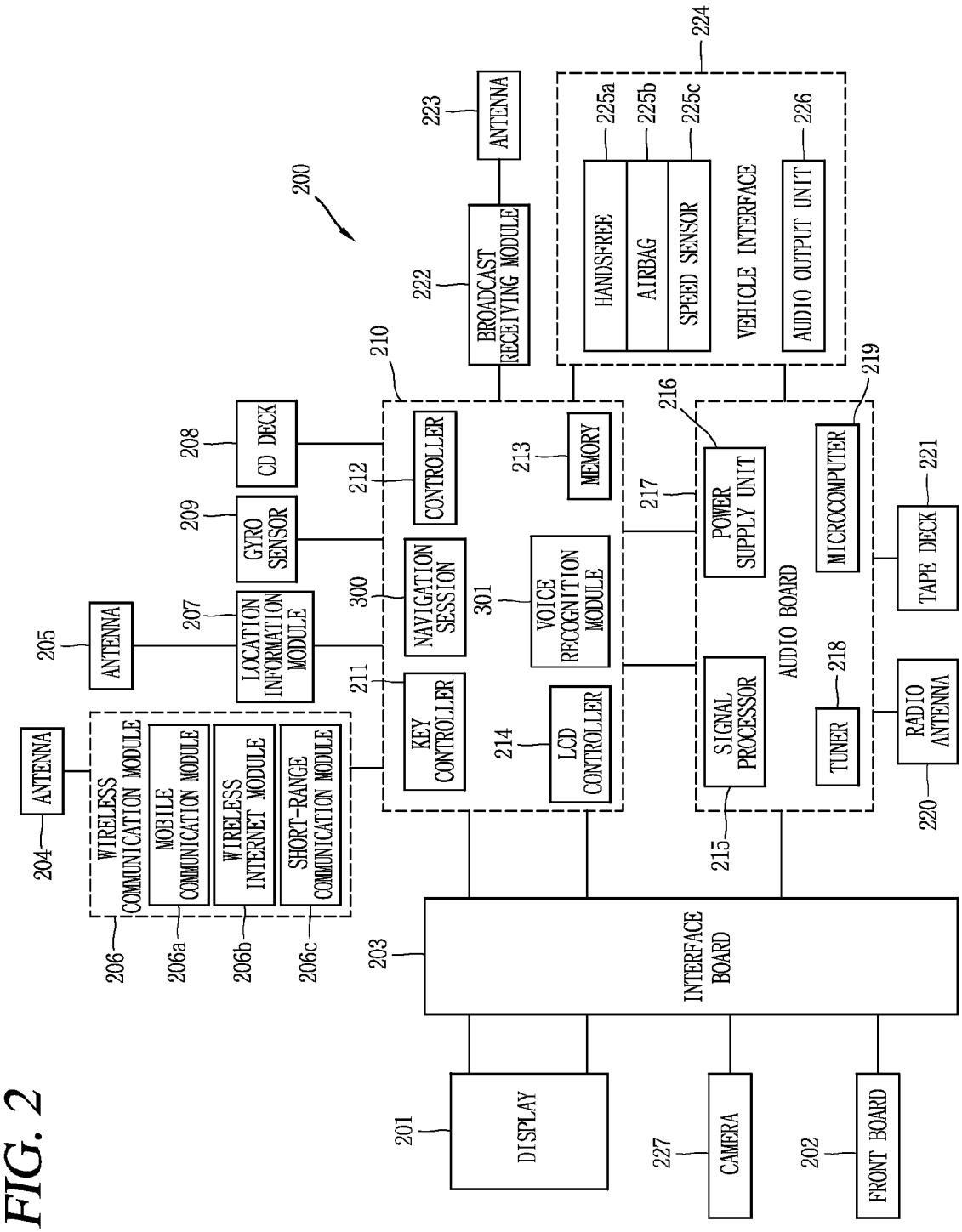
FIG. 2 is a view illustrating a configuration of an image display apparatus in accordance with one exemplary embodiment of the present invention.

FIG. 2 is a view illustrating an image display apparatus in accordance with one exemplary embodiment of the present invention. As illustrated in FIG. 2, an image display apparatus 200 includes may include a controller (e.g., central processing unit (CPU)) 212 for controlling the overall operation of the telematics terminal 200, a memory 213 for storing a variety of information, a key controller 211 for controlling a variety of key signals, and a main board 210 having a liquid crystal display device (LCD) controller 214 for controlling an LCD.

The memory 213 stores map information (map data) for displaying road guide information on a digital map. In addition, the memory 213 stores information for an algorithm of controlling traffic information collection based on an input of traffic information including a road condition in which a vehicle is currently traveling, and information for controlling the algorithm.

The main board 210 may include a wireless communication module 206 configured to allow for wireless communication between the image display apparatus 200 and an external device 100 or wireless communication between the image display apparatus 200 and a network where the image display apparatus 200 is located, a location information module 207 configured to receive a GPS signal to guide a location of a vehicle and to track a traveling path from a departure to a destination, or to transmit traffic information collected by the user as a global positioning system (GPS) signal, a CD deck 208 to reproduce a signal recorded on a compact disk (CD), a gyro sensor 209, and the like. The wireless communication module 206 and the location information module 207 are configured to transmit and receive a signal through antennas 204 and 205.

The wireless communication module 206 is a mobile electronic device having a unique device number. The wireless communication module 206 may include a mobile communication module 206a to perform transmission and reception of a wireless signal with at least one of a base station, an external terminal and a server on a mobile communication network, a wireless Internet module 206b to access a wireless Internet using a communication method, such as Wireless LAN (WLAN), Wi-Fi, Wireless Broadcast (Wibro), World Interoperability for microwave access (Wimax), High Speed Downlink Packet Access (HSDPA) and the like, a short-range communication module 206c to perform communication using Bluetooth, Radio frequency identification (RFID), infrared Data association (IrDA), Ultra wideband (UWB), ZigBee, Wireless LAN (Bluetooth, protocols such as 802.11n, etc.), and the like.

Also, a broadcast receiving module 222 may be connected with the main board 210 and receive a broadcast signal via an antenna 223. The main board 210 may be connected via an interface board 203 with a display unit (i.e., an LCD) 201 controlled by the LCD controller 214, a front board 202 controlled by the key controller 211, and a camera 227 for capturing the interior and/or the exterior of the vehicle. The display unit 201 may display various video signals and character signals, and the front board 202 may include buttons for various key signal inputs and provide a key signal corresponding to a button selected by the user to the main board 210. In some instances, the display unit 201 may include a proximity sensor of FIG. 1 and a touch sensor (touch screen).

The front board 202 may include a menu key for directly inputting traffic information. The menu key may be controlled by the key controller 211.

An audio board 217 may be connected to the main board 210 and process various audio signals. The audio board 217 may include a microcomputer 219 for controlling the audio board 217, a tuner 218 for receiving a radio signal, a power supply unit 216 for supplying power to the microcomputer 219 and a signal processing unit 215 for processing various voice signals.

The audio board 217 may also include a radio antenna 220 for receiving a radio signal and a tape deck 221 for playing an audio tape. The audio board 217 may further include an audio output unit (for example, an amplifier) 226 for outputting a voice signal processed by the audio board 217.

The audio output unit (amplifier) 226 may be connected to a vehicle interface 224. Namely, the audio board 217 and the main board 210 may be connected to the vehicle interface 224. A hands-free module 225a for receiving a voice signal, an airbag 225b configured for the safety of a passenger, a speed sensor 225c for detecting the speed of the vehicle and the like may be connected to the vehicle interface 224. The speed sensor 225c may calculate a vehicle speed and provide the calculated vehicle speed information to the CPU 212.

A navigation session (or a search unit) 300 applied to the image display apparatus 200 may generate road guide information based on the map data and current location information of the vehicle and provide the generated road guide information to a user.

The display unit 201 may detect a proximity touch within a display window via the proximity sensor. For example, when a pointer (e.g., user's finger or stylus) give a proximity touch, the display unit 201 may detect the position of the proximity touch and output position information corresponding to the detected position to the controller 212.

Meanwhile, the map data for searching for the travel route may be stored in the memory 213 or received from an external network through the wireless communication unit 110.

The voice recognition module 301 may recognize a voice pronounced by the user and perform a corresponding function according to the recognized voice signal.

The navigation session 300 applied to the image display apparatus 200 may display a travel route on map data. When the external device 100 is located within a preset distance from a blind spot included in the travel route, the navigation session 300 may automatically form wireless networks with terminals (e.g., vehicle navigation apparatuses) mounted in a neighboring vehicle or mobile communication terminal carried around by a neighboring pedestrian via radio communication (for example, a short-range wireless communication network), to receive location information of the neighboring vehicle from the terminal mounted in the neighboring vehicle and receive location information of the neighboring pedestrian from the mobile communication terminal carried around by the neighboring pedestrian.

In the meantime, the main board 210 may be connected to an interface unit (not illustrated). The interface unit (not illustrated) may include an external device interface unit and a network interface unit. The external device interface unit may include an A/V input/output unit (not illustrated) or a wireless communication unit (not illustrated). The external device interface unit may be connected in a wired or wireless manner to an external device, such as a digital versatile disk (DVD), a Blue ray, a gaming machine, a camera, a camcorder, a computer (notebook) and the like. Also, the network interface unit may allow an access to a predetermined webpage through an accessed network or another network linked to the accessed network. That is, the image display apparatus 200 may perform data transmission and reception with a corresponding server by accessing the predetermined webpage through the network.

According to an embodiment of the present invention, the image display apparatus 200 may be an HUD, a projector, or a display apparatus located at a rear seat of the vehicle. When the image display apparatus 200 is the display apparatus located at the rear seat of the vehicle, it may perform communication with the HUD or projector located at a front seat of the vehicle through the wireless communication module 206.

Figure 3A:
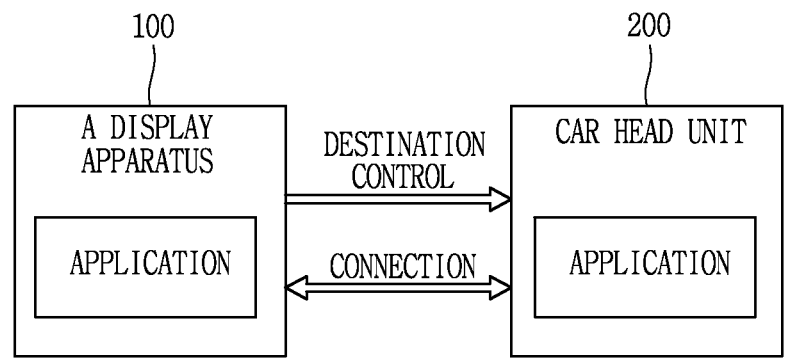
FIGS. 3A and 3B are conceptual views illustrating an image display apparatus and an external device connected with the image display apparatus in accordance with one exemplary embodiment of the present invention.
Figure 3B:
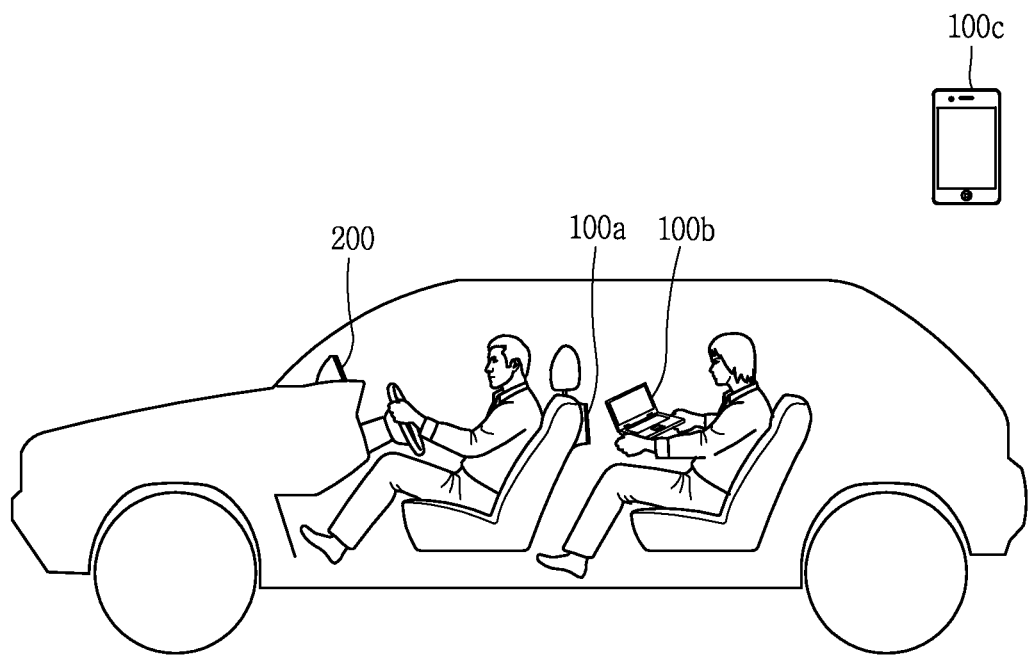

FIGS. 3A and 3B are conceptual views illustrating an image display apparatus and an external device connected with the image display apparatus in accordance with one exemplary embodiment of the present invention.

As illustrated in FIG. 3A, the external device 100 may be connected to the image display apparatus 200 in a wired or wireless manner, to transmit an execution result (e.g., screen image or voice) of an application executed on the electronic device 100 or information related to a destination or a driving path (or a travel route) of the vehicle through an interface. Here, the electronic device 100 may be located inside the vehicle, or outside the vehicle within a wirelessly-connectable range.

The image display apparatus 200 may be connected with at least one electronic device 100 in a wired or wireless manner, to receive a screen image or voice or information related to a destination or a driving path of the vehicle from the electronic device 100 for output. The image display apparatus 200 may be located at the front or rear seat of the vehicle and mounted in a fixed or detachable manner.

The image display apparatus 200 may receive a specific command input from a user through an interface and transmit the received specific command to the connected electronic device 100. For example, when the user inputs a specific command by touching or pressing a touch pad or a keypad provided on a screen of the image display apparatus 200, the image display apparatus 200 may sense a location of a point at which the input is applied, and transmit information related to the sensed location to the connected electronic device 100.

The electronic device 100 may determine that a touch event has occurred at the touch-applied point, and perform an operation corresponding to the occurred event. That is, the user may control the operation of the electronic device 100 using the touch pad, the keypad and the like provided on the image display apparatus 200.

In detail, when the image display apparatus 200 for the vehicle and the electronic device 100 are connected to each other, the user may execute a road guiding application (or a dialing, a phonebook, an e-mail, a video reproduction application, etc.) installed on the electronic device 100. The electronic device 100 may then transmit an execution image of the road guiding application to the image display apparatus 200 such that the execution image of the road guiding application can be displayed on the image display apparatus 200. In other words, the user can view the execution image of the road guiding application on a large screen of the image display apparatus 200, other than a small screen of the electronic device 100. Also, the user can hear a road guidance voice through a speaker provided in the vehicle, other than a speaker of the electronic device 100.

The electronic device 100 and the image display apparatus 200 may be connected using a short-range communication protocol such as Bluetooth and the like, a wireless Internet protocol such as Wi-Fi and the like, an external device interface protocol such as universal serial bus (USB) and the like, etc.

A first application for providing a service according to a request of a client may be installed on the electronic device 100, and a second application for accessing a service provided by a server may be installed on the image display apparatus 200.

A server application of the electronic device 100 captures a screen of the electronic device 100, irrespective of a type of application of a mobile terminal, and transmits the captured screen to a client application of the image display apparatus 200. Also, the server application may control the operation of the electronic device 100 based on information related to an event generated in the image display apparatus 200 sent from the client application.

For example, the image display apparatus 200 may remotely control the electronic device 100 in a virtual network computing (VNC) manner using a remote frame buffer (RFB) protocol which provides a remote access to graphic user interfaces (GUIs). The VNC is configured in a manner that a mobile terminal 100 transfers a screen update to the image display apparatus 200 and transmits an input event generated in the image display apparatus 200 to the electronic device 100 through a network.

The electronic device 100 may transmit a voice to the image display apparatus 200, a headset or a hands-free, for example, according to an advanced audio distribution profile (A2DP) that defines sound quality of an audio (stereo or mono) which can be streamed from a first device to a second device through a Bluetooth connection, specifically, a headset profile (HSP) for a Bluetooth headset, specifically, a hands-free profile (HFP) applied to a hands-free kit for a vehicle, and the like.

Meanwhile, the image display apparatus 200 and the electronic device 100 may exchange additionally-required information based on separate protocols. For example, the image display apparatus 200 may provide the electronic device 100 with vehicle status information, such as driving information, speed information, fuel information, and the like.

Some applications installed on the electronic device 100 may use the vehicle status information received from the image display apparatus 200 by use of separate protocols. Such applications may provide application-related information, such as an application type (e.g., road guide, multimedia, game, etc.), a GUI type (e.g., map, video, menu, etc.), an application state (e.g., whether the application is currently executed on a foreground or a background), and the like.

Referring to FIG. 3B, the image display apparatus 200 may be an HUD or a projector located at the front seat of the vehicle. Also, the electronic device 100 connected with the image display apparatus 200 may be a display 100a located at the rear seat of the vehicle, a terminal 100b such as a notebook located within the vehicle, or a mobile terminal 100c located outside the vehicle. The image display apparatus 200 may access the display 100a located at the rear seat of the vehicle to perform communication with the display 100a, or access the display 100a located at the rear seat of the vehicle which is connected to the mobile terminal 100c located outside the vehicle. That is, the image display apparatus 200 may access one external device or a plurality of external devices.

Meanwhile, the image display apparatus 200 may also be connected with an information providing center and the like providing traffic information and various types of data (e.g., programs, execution files, etc.) through wired and wireless communication networks, such as local area network (LAN) and wide area network (WAN).

The vehicle having the image display apparatus 200 therein refers to every transportation which can be implemented using a machine or an electronic device for the purpose of moving or carrying people or objects, and examples of the vehicle include typical cars, buses, trains, ships, airplanes, and the like.

The image display apparatus 200 according to the embodiment of the present invention may output a first map screen on the display unit 201, and access the electronic device 100 to perform transmission and reception of at least one data with the electronic device 100 through the wireless communication module 206. When location data selected by using a second map screen is received from the accessed electronic device 100, the controller 212 of the image display apparatus 200 determines (decides) a geographical location corresponding to the received location data, calculates coordinate values of the determined geographical location, and outputs the calculated coordinate values on the first map screen.

When the coordinate values of the geographical location are calculated, a select signal for setting the calculated coordinate values as a destination or a waypoint is input through the user input unit (the front mode 202, the display unit 201 or the voice recognition module 301) of the image display apparatus 200. That is, the user may input through the user input unit whether or not to set the geographical location output on the image display apparatus 200 as the destination/waypoint. The controller 212 may then generate road guide information according to the input select signal, and output a driving path corresponding to the generated road guide information on the first map screen.

The image display apparatus 200 and the electronic device 100 may be connected to each other using a short-range communication protocol such as Bluetooth and the like, a wireless Internet protocol such as Wi-Fi and the like, an external device interface protocol such as universal serial bus (USB) and the like, etc.

Here, the first map screen may be a map prestored in the memory 213 of the image display apparatus 200 or an image captured through an external camera. Also, the second map screen may be a map or image prestored in the memory 160 of the external device 100 or downloaded from another server that is accessed by executing an application.

The first map screen and the second map screen, for example, may be in a shape of a graphic or picture (photo) including geographical information, and may include text information related to the geographical information. Also, the first map screen and the second map screen may include different types of geographical information from each other. For example, the first map screen and the second map screen may output a magnification ratio, a direction and the like in different manners, or one may be an image and the other may be a picture (photo).

The location data is metadata for a specific location and, for example, may include geographic coordinates indicating the latitude and the longitude, universal transverse mercator (UTM) coordinates, universal polar system (UPS) coordinates, transverse mercator (TM) coordinates and the like.

The metadata is received in the image display apparatus 200 and used when determining the geographical location corresponding to the location data.

Here, the selection of the location data of the map data may be carried out by touching a specific location on the first map screen or the second map screen, manipulating a menu key on a popup window associated with the specific location, or receiving a user's voice command.

The geographical location is determined by detecting a point of interest (POI), an address, a phone number or the like, which matches the metadata included in the location data, from the memory 213 of the image display apparatus 200. When the matched POI, address or phone number is not detected, a location that is estimated based on GPS information included in the metadata may be decided as the geographical location.

Here, the coordinate values refer to X and Y coordinates of a location to which the POI, address or phone number corresponds on the first map information (first map screen).

As described above, the destination/waypoint of the vehicle can be selected through the external device connected with the image display apparatus and a driver can set or change the destination/waypoint merely by a simple approval. This may allow for fast search for the destination/waypoint without interference with the driver's driving, resulting in enhancement of convenience in use.

Hereinafter, description will be given in detail of an operating method of an image display apparatus for setting location data, which is received by accessing the external device 100, with reference to FIGS. 4, 5 and 7A to 7C.

Figure 4:
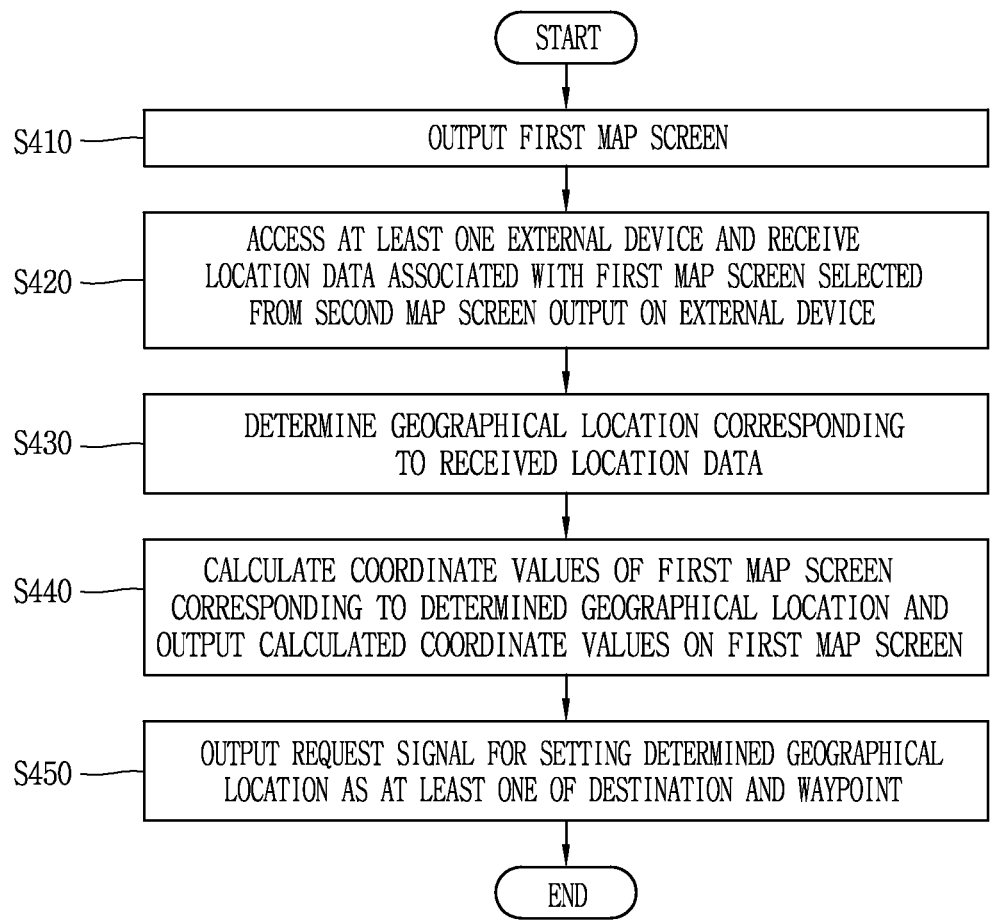
FIG. 4 is a flowchart illustrating an operating method of an image display apparatus in accordance with one exemplary embodiment of the present invention.

FIG. 4 is a flowchart illustrating an operating method of an image display apparatus for outputting location data received from a connected (accessed) external device on a display of the image display apparatus, which uses different map information, in accordance with one exemplary embodiment of the present invention.

As illustrated in FIG. 4, the image display apparatus 200 according to the embodiment of the present invention may output a first map screen on the display unit 201 (S410). Here, the first map screen is map data prestored in the memory 213 of the image display apparatus 200, for example, may be a graphic or picture including predetermined text information. Also, the image display apparatus 200 may first perform accessing at least one external device to be explained hereinafter, prior to outputting the first map screen.

The image display apparatus 200 accesses the external device 100 and receives location data associated with the first map screen, which has been selected using a second map screen, from the accessed electronic device 100 through the wireless communication module 206 (S420).

The image display apparatus 200 and the electronic device 100 may be connected to each other using a short-range communication protocol such as Bluetooth and the like, a wireless Internet protocol such as Wi-Fi and the like, an external device interface protocol such as universal serial bus (USB) and the like, etc.

Examples of the electronic device 100 connected with the image display apparatus 200, for example, may include cellular phones, smart phones, laptop computers, digital broadcast terminals, personal digital assistants (PDAs), portable multimedia players (PMPs), navigators, slate PCs, tablet PCs, ultra books, fixed terminals (e.g., a display fixed to a rear seat of a vehicle) and the like.

The image display apparatus 200 and the electronic device 100 may be connected to each other by transmitting and receiving predetermined request message and response message using a predetermined communication protocol. Here, the predetermined request message and response message may be generated by at least one of a preset key input, an input of a voice command and a gesture input applied to the image display apparatus 200.

The second map screen may be map data prestored in the memory 160 of the electronic device 100, or map data downloaded from another server which is accessed by executing an application on the electronic device 100. The map data may be in a shape of a graphic or picture including geographical information. Also, the second map screen may be a different type of map data from the first map screen output on the image display apparatus 200. For example, the first map screen and the second map screen may output a magnification ratio, a direction and the like in different manners, or one may be an image including text information and the like and the other may be a picture.

The second map screen may include all or part of the first map screen. That is, a specific location displayed on the first map screen may be selected from the second map screen.

Meanwhile, the selection of the location data using the second map screen in the electronic device 100 connected with the image display apparatus 200 may be carried out in various ways.

For example, the location data may be selected by inputting text information related to the specific location (e.g., a name, address or phone number of the specific location) using a search window output on the display of the electronic device 100. As another example, the location data may be selected by applying a touch input to the specific location on the second map screen output on the display of the electronic device 100. As another example, the location data may be selected by inputting a voice command associated with the specific location to the electronic device 100.

When the location data is received from the connected electronic device 100, the controller 212 of the image display apparatus 200 determines a geographical location corresponding to the received location data (S430).

In detail, the determination of the geographical location may be carried out using metadata included in the selected location data, for example, GPS information including the latitude and the longitude of the corresponding location, POI information, an address, a phone number and the like.

When the geographical location is determined, the controller 212 calculates coordinate values of the determined geographical location and outputs the calculated coordinate values on the first map screen (S440).

Here, the coordinate values of the geographical location refer to X and Y coordinates of a location corresponding to the determined geographical location on the first map screen output on the display unit 201.

Meanwhile, when the calculation of the coordinate values corresponding to the geographical location is failed, the controller 212 may output a location, which is estimated based on (comparing) similarity between the first map screen output on the image display apparatus 200 and the second map screen output on the electronic device 100, on the first map screen. For example, when the first map screen is a photo (picture), the controller 212 may output a location, which is estimated by applying a perspective view calculated upon acquiring the first map screen through the camera 227, on the first map screen.

The controller 212 may control the display unit 201 to output a predetermined indicator, for example, an arrow, a circle, a spot, a line or the like, corresponding to the corresponding coordinate values on the first map screen. The controller 212 may also output a highlighting effect that the indicator flickers.

The controller 212 may also output a current location of the vehicle on the first map screen. Here, shapes of indicators output at the current location of the vehicle and the calculated coordinate values may be distinguishable.

Continuously, the controller 212 may output a request signal for setting the geographical location corresponding to the calculated coordinate values as one of a destination and a waypoint of the vehicle (S450). Here, the request signal may be output on the display unit 201 in the form of a message or the form of an audio signal.

Meanwhile, the controller 212 may set or change the geographical location corresponding to the calculated coordinate values as the destination and the waypoint of the vehicle, based on a user input in response to the output request signal. Also, the controller 180 may output road guide information corresponding to the set or changed destination and waypoint on the first map screen. Here, the user input may be realized in various manners, but preferably be set to respond to the request signal through a voice command, taking into account the driver's safety.

The foregoing description has been given of the operating method of the image display apparatus in which location data is received from the electronic device 100, which uses different map information, and output on map information displayed on the image display apparatus 200. Hereinafter, a method of setting or changing a destination/waypoint on the image display apparatus 200 using the operating method will be described.

Figure 5:
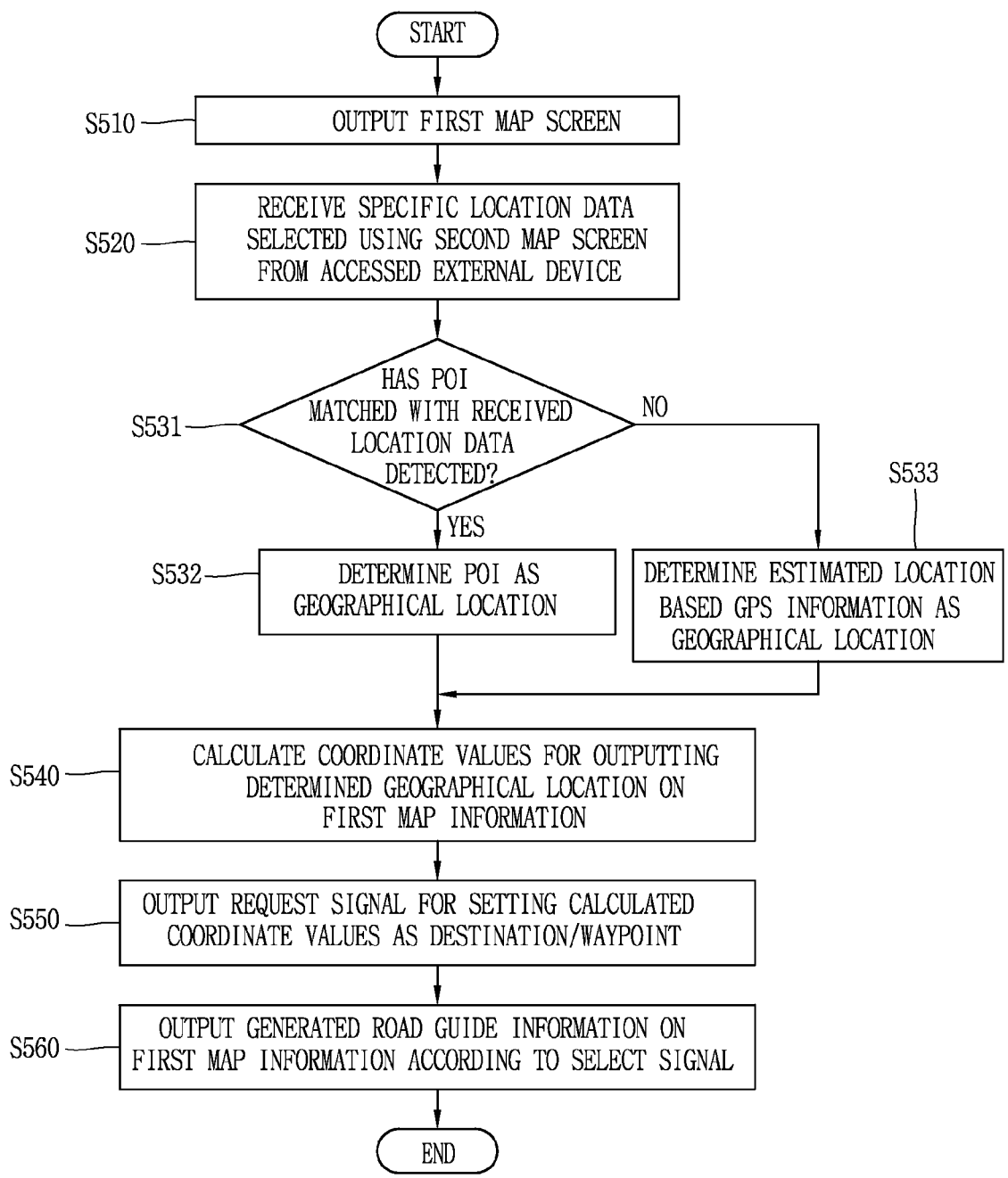
FIG. 5 is a flowchart illustrating an operating method of an image display apparatus for setting a destination or a waypoint according to location data received from a connected (or accessed) external device in accordance with one exemplary embodiment of the present invention.
Figure 7A:
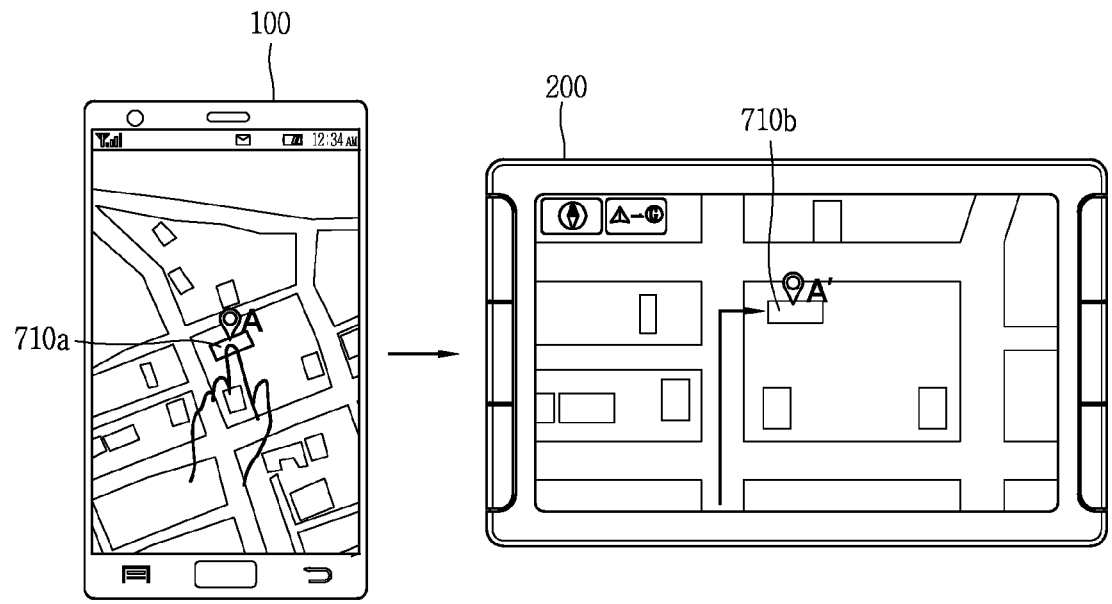
FIGS. 7A to 7C are conceptual views illustrating the operating methods of FIGS. 4 and 5.
Figure 7B:
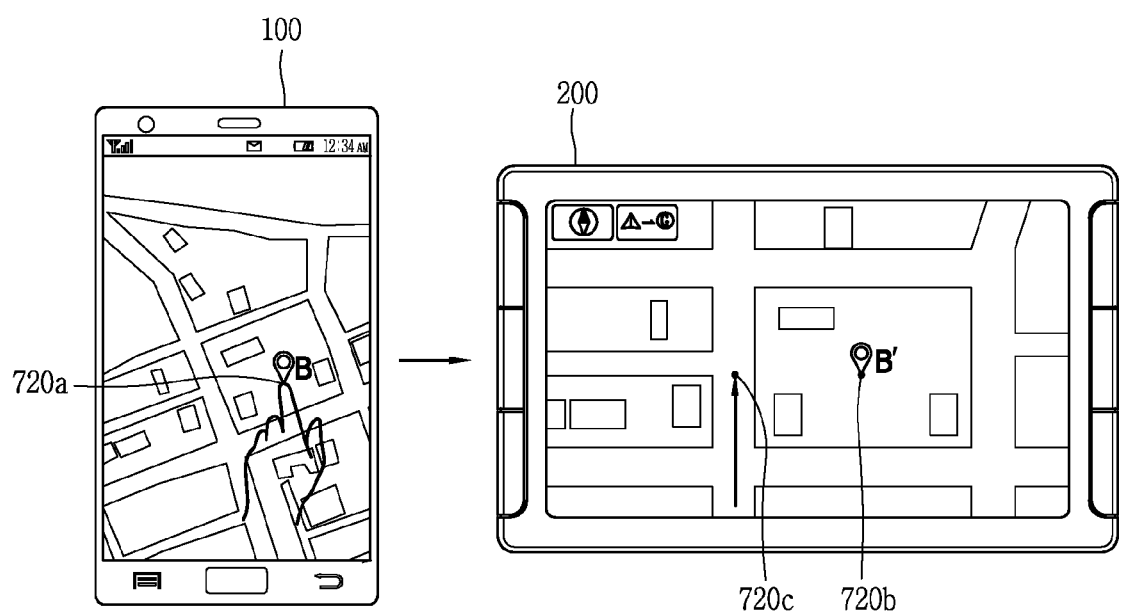
Figure 7C:
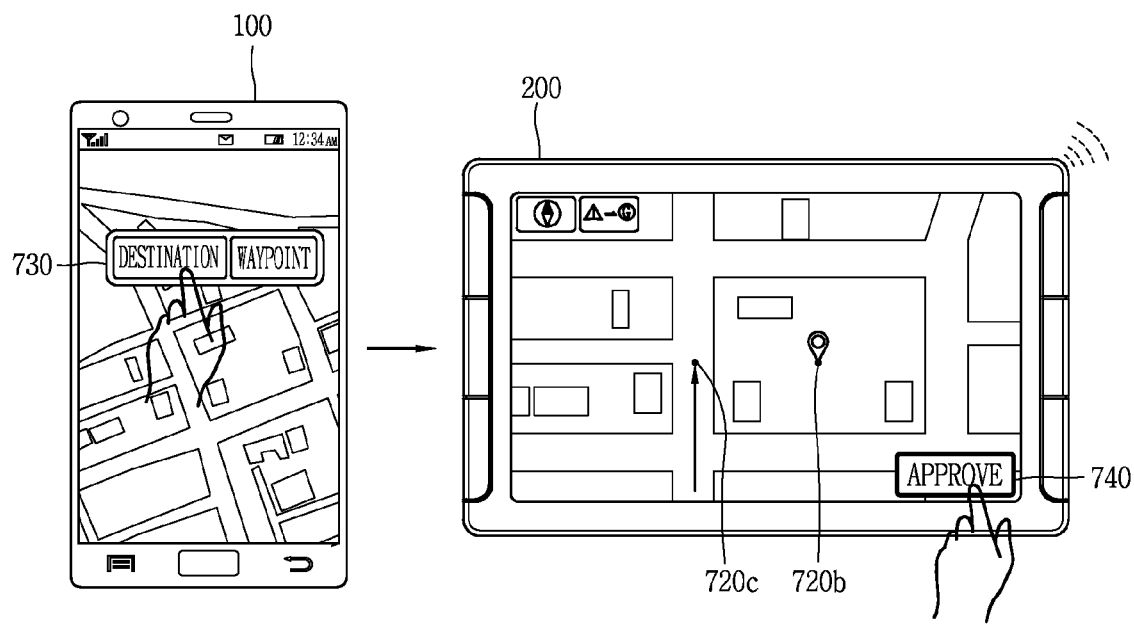

FIG. 5 is a flowchart illustrating an operating method of an image display apparatus for setting a destination or a waypoint according to location data received from a connected external device in accordance with one exemplary embodiment of the present invention. Also, FIGS. 7A to 7C are conceptual views illustrating the operating method of FIG. 5.

Referring to FIG. 5, the controller 212 of the image display apparatus 200 may output a first map screen on the display unit 201 (S510).

The image display apparatus 200 may access at least one electronic device 100 and receive location data associated with the first map screen, selected using a second map screen, from the accessed electronic device 100 through the wireless communication module 206 (S520).

The selection of the location data using the second map screen in the electronic device 100 connected with the image display apparatus 200 may be carried out in various ways.

For example, the location data may be selected by inputting text information related to a specific location (e.g., a name, address or phone number of the specific location) using a search window output on the display of the electronic device 100. As another example, the location data may be selected by applying a touch input to the specific location on the second map screen output on the display of the electronic device 100. As another example, the location data may be selected by inputting a voice command associated with the specific location to the electronic device 100.

When the location data is received from the accessed electronic device 100, the controller 212 of the image display apparatus 200 determines whether or not the memory 213 stores therein a point of interest (POI) that matches the location data (S531).

For example, referring to FIG. 7A, when a touch input is applied to a specific location 710a of map information output on the electronic device (e.g., mobile terminal) 100, data associated with the corresponding location 710a, for example, GPS information, POI information, an address, or a phone number is transmitted to the image display apparatus (e.g., navigator) 200. The controller 212 of the image display apparatus 200 then compares the transmitted data associated with the specific location 710a with prestored data in the memory 213, to detect whether or not there is matched data, for example, the matched POI information. That is, when the map information output on the electronic device (e.g., mobile terminal) 100 is different from the map information output on the image display apparatus (e.g., navigator) 200, direct data matching may not be allowed. Therefore, such different map information may be controlled to be cooperative with each other using metadata included in the received location data.

When there is the POI that matches the location data is present according to the detection at the step S531, the controller 212 determines the detected POI as the geographical location.

Still referring to FIG. 7A, when the touch input is applied to the specific location 710a of the map information output on the electronic device (e.g., mobile terminal) 100, the image display apparatus (e.g., navigator) 200 receives the data associated with the corresponding location 710a. The image display apparatus (e.g., navigator) 200 searches for the memory 213 to determine a POI location 710b that matches the data associated with the corresponding location 710a as the geographical location.

When there is not a POI that matches the location data according to the detection at the step S531, the controller 212 may determine a location estimated based on the GPS information included in the location data as the geographical location (S533).

The case where there is no POI matched by the location data may include, for example, a case where second map information output on the electronic device 100 includes updated road information but the updated road information has not been reflected yet to first map information output on the image display apparatus 200.

With regard to this, referring to FIG. 7B, a touch input is applied to a specific location 720a of the map information output on the electronic device (e.g., mobile terminal) 100, and data associated with the corresponding location 720a is received in the image display apparatus (e.g., navigator) 200. When there is not a POI 720b that matches the received data, the controller 212 outputs a location 720b corresponding to GPS information included in the received data, namely, information on the latitude and the longitude of the selected specific location 720a, on the map information output on the image display apparatus (e.g., navigator) 200. Also, the controller 212 determines a location, which is estimated based on the GPS information included in the data associated with the selected specific location 720a, namely, the closest road or POI location at the output location 720b, as a geographical location 720c.

When the geographical location is determined, the controller 212 calculates coordinate values of the determined geographical location and outputs the calculated coordinate values on the first map screen (540).

For example, as illustrated in FIG. 7A, the controller 212 may output a predetermined indicator A' on the determined geographical location 710b or highlight an adjacent area of the indicator A', on the map information output on the display unit 201.

Also, as illustrated in FIG. 7B, the controller 212 may output a predetermined indicator B' on the location 720b corresponding to the GPS information of the specific location 720a on the map information output on the display unit 201. The controller 212 may output or may not output another indicator on the finally-determined geographical location 720c.

The controller 212 may also control the display unit 201 to output additional data information related to the determined geographical location on the first map screen. Here, additional data information, for example, may include information related to surrounding areas of the determined geographical location (e.g., surrounding POI information), an expected arrival time at and a remaining distance to the determined geographical location, road traffic information and the like.

The additional data information may be useful when the image display apparatus 200 is a display located at the rear seat of the vehicle without a navigation function.

When the location corresponding to the calculated coordinate values is output on the first map screen, the controller 212 receives a select signal for setting the location corresponding to the coordinate values as one of a destination and a waypoint, in response to a user input (S550).

In other words, the user may set the location corresponding to the calculated coordinate values as the destination or waypoint through the user input unit (e.g., the display unit 201 having a touchpad, the front board 202 and the audio recognition module 301. Here, the user input unit may be implemented into a keypad, a touch screen, a jog shuttle, a microphone and the like.

The controller 212 may also output a predetermined indicator at the location corresponding to the coordinate values or highlight the indicator.

When text location data input using a search window is received from the accessed electronic device 100, the controller 212 may control the display unit 201 to output an interface for setting the text location data directly as one of the destination and the waypoint.

For example, when the determined geographical location is output on the map information, the controller 212 may pop up a setting key, on which 'Destination' and 'Waypoint' are output, on one area of the display unit 201.

The controller 212 may output a voice message through the audio output unit 226 simultaneous or sequential to the popup of the setting key. For example, when the setting key with 'Destination' and 'Waypoint' output thereon is popped up, a voice like "Do you want to change the destination to oo?" may be output through the audio output unit 226. Also, when the destination is set by manipulating the popped-up setting key or an approve key, a voice like "The destination is set to oo" may be output through the audio output unit 226.

Meanwhile, in accordance with another embodiment, a user interface for setting the determined geographical location as one of the destination and the waypoint may be output on the electronic device 100. In this instance, the user of the electronic device 100 may input the determined geographical location as one of the destination and the waypoint by using the output user interface. In this manner, when a signal input through the electronic device 100 is received in the image display apparatus 200, the controller 212 may output a predetermined input window on the display unit 201 or output a voice message for requesting for the approval through the audio output unit 226, in order to receive the final approval from the driver.

For example, as illustrated in FIG. 7C, the location 720a corresponding to the GPS information of the location data selected through the external device 100 and the geographical location 720c determined based on the location 720a are output on the image display apparatus 200. When the user of the external device 100 inputs the selected location data as "Destination" through a user interface 730 output on the screen, a corresponding input signal is transmitted to the image display apparatus 200. The controller 212 of the image display apparatus 200 outputs an 'approve' key 740 on one area of the display unit 201 to receive the driver's approval for setting the determined geographical location 720c as "Destination." The driver may set or change the destination by touching the 'approve' key output on the display unit 201.

In this manner, when the select signal for setting the location corresponding to the coordinate values as the destination/waypoint is input, the controller 212 may generate road guide information corresponding to the input select signal on the first map screen (S560).

Here, when the select signal is a signal transmitted from the external device 100, the controller 212 may output an interface for requesting for the driver's approval on the display unit 201 or through the audio output unit 226.

For example, referring to FIG. 7C, when the driver touches the 'approve' key output on the display unit 201, the controller 212 may generate road guide information indicating the determined geographical location 720c as "Destination" and output a vehicle travel route (driving path) corresponding to the generated road guide information on the display unit 201.

Meanwhile, when the select signal is input to set the determined geographical location as 'Waypoint,' the controller 212 re-searches for road guide information to arrive at the destination via the set 'Waypoint.' The controller 212 then changes the vehicle travel route according to the re-search result. Here, when a plurality of 'waypoints' are selected, the controller 212 re-searches for the road guide information to sequentially pass through those 'waypoints,' starting from the closest waypoint at the current location of the vehicle.

As described above, when a destination/waypoint of a vehicle is provided through an external device connected with the image display apparatus, a driver can set or change the destination/waypoint merely by a simple approval. This may allow the driver to fast search for the destination/waypoint without interference with his or her driving.

Hereinafter, description will be given of an operating method of the image display apparatus 200 for setting a destination/waypoint according to a touch input by sharing map data with the external device 100 connected therewith, with reference to FIGS. 6 and 8A to 8E.

Figure 6:
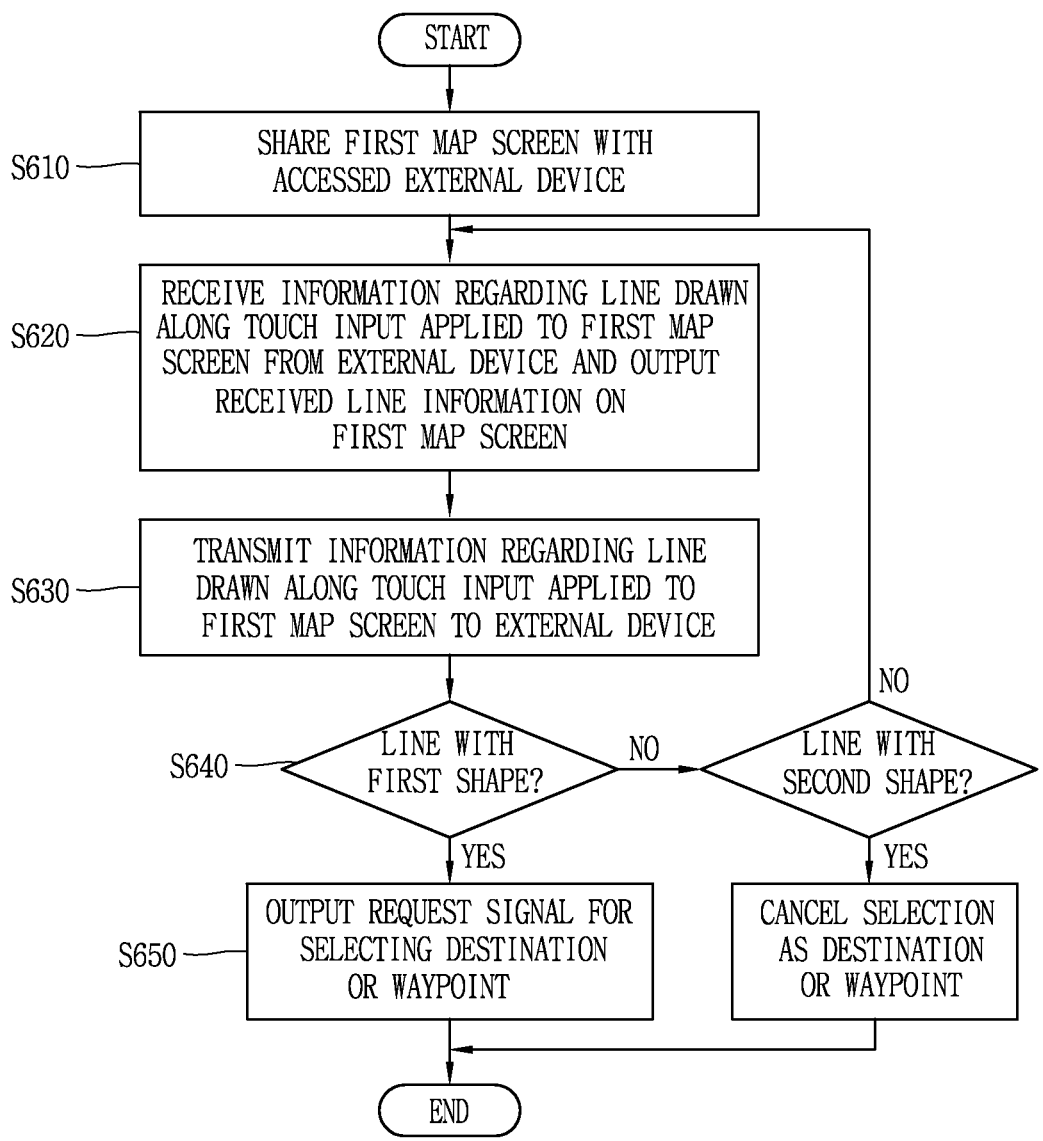
FIG. 6 is a flowchart illustrating an operating method of an image display apparatus for sharing map data with a connected external device and setting a destination or waypoint according to a touch applied to the map data, in accordance with one exemplary embodiment of the present invention.

FIG. 6 is a flowchart illustrating an operating method of an image display apparatus for sharing map data with an accessed external device and setting a destination or waypoint according to a touch applied to the shared map data, in accordance with one exemplary embodiment of the present invention. Also, FIGS. 8A to 8E are conceptual views illustrating the operating method of FIG. 6.

As illustrated in FIG. 6, the image display apparatus 200 may output a first map screen on the display unit 201 according to a preset input signal.

The image display apparatus 200 may then transmit a request message to the external device 100 connected therewith to share the first map screen with the external device 100. Upon receiving a response message to the request message from the connected external device 100, the controller 212 may transmit the first map screen to the connected external device 100 through the wireless communication module 206, thereby sharing the first map screen (S610). Accordingly, the same map screen is output on the displays of the image display apparatus 200 and the external device 100, respectively.

Meanwhile, the sharing of the first map screen output on the image display apparatus 200 has been exemplarily illustrated, but another embodiment may illustrate the sharing of a second map screen output on the connected external device 100 with the image display apparatus 200. When the second map screen is shared, the controller 212 may output the transmitted second map screen on the display unit 201 in a scaling or resizing manner.

Here, the first map screen is map data prestored in the memory 213 of the image display apparatus 200, for example, may be an image captured through an external camera of the vehicle. Also, the second map screen may be an image or data prestored in a memory of the external device or downloaded from another server which is accessed by executing an application.

Herein, examples of the electronic device 100 may include cellular phones, smart phones, laptop computers, digital broadcast terminals, personal digital assistants (PDAs), portable multimedia players (PMPs), navigators, slate PCs, tablet PCs, ultra books, fixed terminals (e.g., a display fixed to a rear seat of a vehicle), servers or PCs of service centers (not illustrated) and the like.

Here, when the external device 100 is a server or PC of a service center (not illustrated), the server or PC of the service center and the image display apparatus 200 can be connected to each other in a manner that the image display apparatus 200 mirrored with a terminal within the vehicle or the image display apparatus 200 having a call function may connect a call to the corresponding service center.

In this instance, when the driver requests the service center to guide to the destination/waypoint through the connected image display apparatus 200 (the driver can request for the guide through a voice or a touch input applied to the map information), an operator of the corresponding service center (not illustrated) may perform a guide service using map information transmitted from the image display apparatus 200 through processes to be explained hereinafter.

When the image display apparatus 200 shares the first map screen with the external device 100 and receives information related to a line drawn along a first touch input applied to a first location of the first map screen from the connected external device 100, the controller 212 may output the information on the line drawn on the first location of the first map screen (S620).

Here, the first touch input may be a preset touch & drag. Also, the information related to the line may include drawn location, shape, thickness, color and the like of the line. Also, the line drawing along the touch input is implemented almost simultaneously on the external device 100 and the image display apparatus 200 except for a transmission time.

The line drawn through the display unit 151 of the external device 100 and the line drawn through the display unit 201 of the image display apparatus 200 may be visually distinctive. To this end, the lines may be output in different colors, thicknesses, shapes and the like.

Figure 8A:
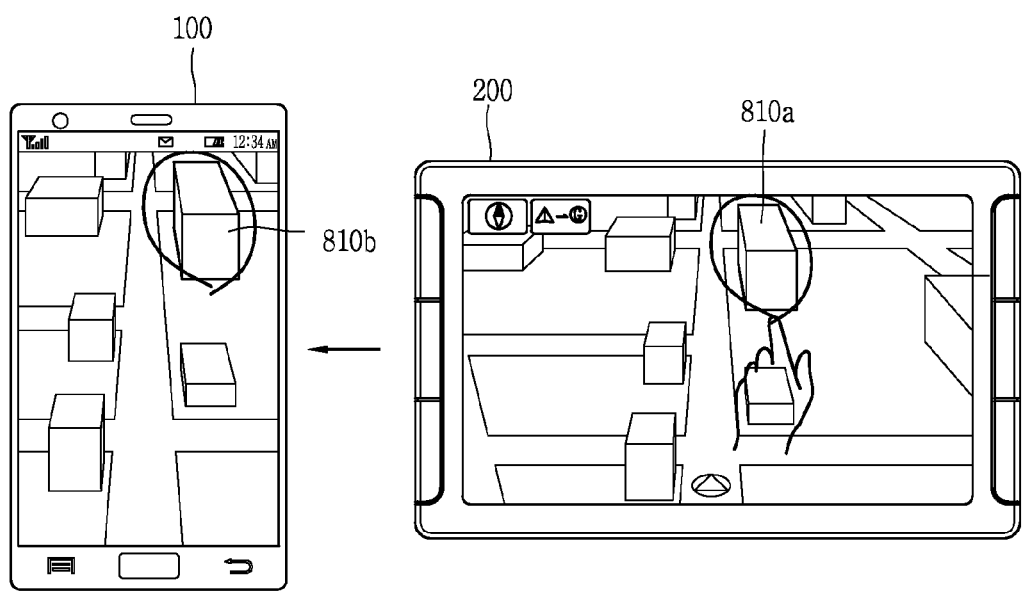
FIGS. 8A to 8E are conceptual views illustrating the operating method of FIG. 6.
Figure 8B:
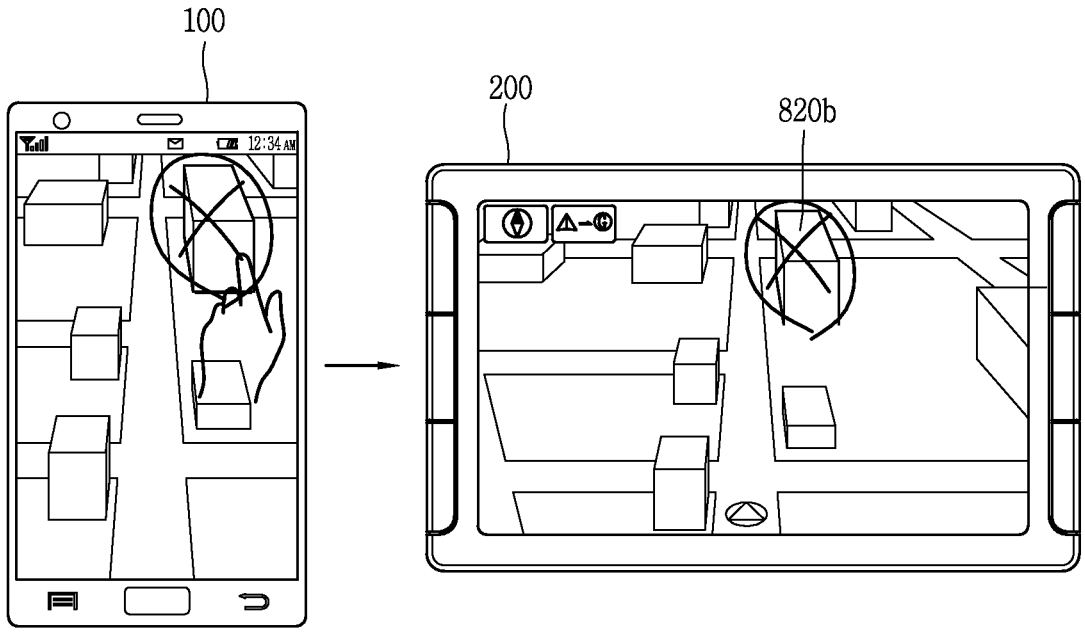

For example, as illustrated in FIG. 8B, when a line 820a in a shape of 'X' is drawn on a map screen of the touch screen of the connected external device (e.g., mobile terminal) 100, information related to the drawn line 820a is transmitted in real time and thus a line 820b in a shape of 'X' is also drawn on the map screen of the display unit 201 of the image display apparatus (e.g., navigator) 200.

When the image display apparatus 200 and the external device 100 share the first map screen and a line is drawn along a second touch input applied to a second location of the first map screen, the controller 212 outputs the line on the display unit 201 and transmits information related to the line to the connected external device 100 (S630).

Here, the second touch input may be a preset touch & drag. Also, the information related to the line may include drawn location, shape, thickness, color and the like of the line. Also, the line drawing along the touch input is implemented almost simultaneously on the external device 100 and the image display apparatus 200 except for a transmission time.

For example, as illustrated in FIG. 8A, when a line 810*a* in a shape of 'O' is drawn on a map screen of the display unit 201 of the image display apparatus 200, information on the drawn line 810*a* is transmitted in real time and thus a line 810*b* in a shape of 'O' is also drawn on the map screen of the touch screen of the external device 100.

Here, when the shape of the drawn line is a first shape (S640), the controller 212 may output on the display unit 201 an interface for selecting a geographical location corresponding to the line-drawn location as one of a destination and a waypoint (S650).

Here, the interface may be a setting key for 'Destination/waypoint' or an 'approve' key with respect to a select signal received from the external device 100. In another embodiment, the destination/waypoint can also be set through a third touch input (e.g., a long touch or a continuous touch) applied to an output geographical location. Also, the first shape may be in the shape of 'O' or 'V', for example, but not limited to that. Any shape may be allowed if it is designated as a setting indication between the image display apparatus 200 and the external device 100.

In detail, the controller 212 generates a first control signal to select the first location or the second location when the drawn line along the first touch input or the second touch input has the first shape. The controller 212 outputs on the display unit 201 a user interface (e.g., a setting key or an approve key) for setting the first location or the second location as the destination/waypoint according to the first control signal.

On the other hand, when the drawn line has the second shape (S660), the controller 212 may cancel the selection of (deselect) the geographical location corresponding to the line-drawn location as the destination or waypoint (S670).

Here, the second shape may be in the shape of 'X,' for example, but not limited to that. Any shape may be allowed if it is designated as a cancel indication (i.e., deselection) between the image display apparatus 200 and the external device 100. When the second shape is drawn before setting the destination or waypoint, the controller 212 may recognize it as the deselection.

In detail, the controller 212 generates a second control signal to deselect the first location or the second location when the drawn line along the first touch input or the second touch input has the second shape. The controller 212 cancels the setting of the first location or the second location as the destination/waypoint according to the second control signal.

Referring to FIGS. 8A to 8E, the aforementioned processes will be described hereinafter. First of all, the image display apparatus (e.g., navigator) 200 and the external device (e.g., mobile terminal) 100 are connected to each other and share map data output on the image display apparatus (e.g., navigator) 200.

The image display apparatus 200, for example, may be connected to the external device (e.g., mobile terminal) 100 in a mirroring manner, and share an image captured through an external camera of a vehicle as the map image with the external device 100. Also, the display unit 201 of the image display apparatus 200 and a screen of the external device 100 each may have a touchpad so as to be sensitive to touch.

As illustrated in FIG. 8A, when a line in a shape of 'O' is drawn on a specific location 810*a* of a map drawing output on the display unit 201 of the image display apparatus 200, information related to the drawn line is transmitted to the external device 100 and thus the line in the shape of 'O' is also drawn on the same location 810*b* on the screen of the external device 100. The controller 212 then recognizes that the specific location 810*a* with the 'O-shaped' line has been "selected."

If the user of the external device 100 does not want to recommend the corresponding location 810*b* as a destination, as illustrated in FIG. 8B, the user may draw a line in the shape of 'X' on the same location 820*a* through a touch input. Information related to the drawn line is transmitted to the image display apparatus 200 and thus the line in the shape of 'X' is also drawn on the same location 820*b* on the display unit 201 of the image display apparatus 200. The controller 212 of the image display apparatus 200 then recognizes that the location 820*b* with the 'X-shaped' line has been "deselected."

Figure 8C:
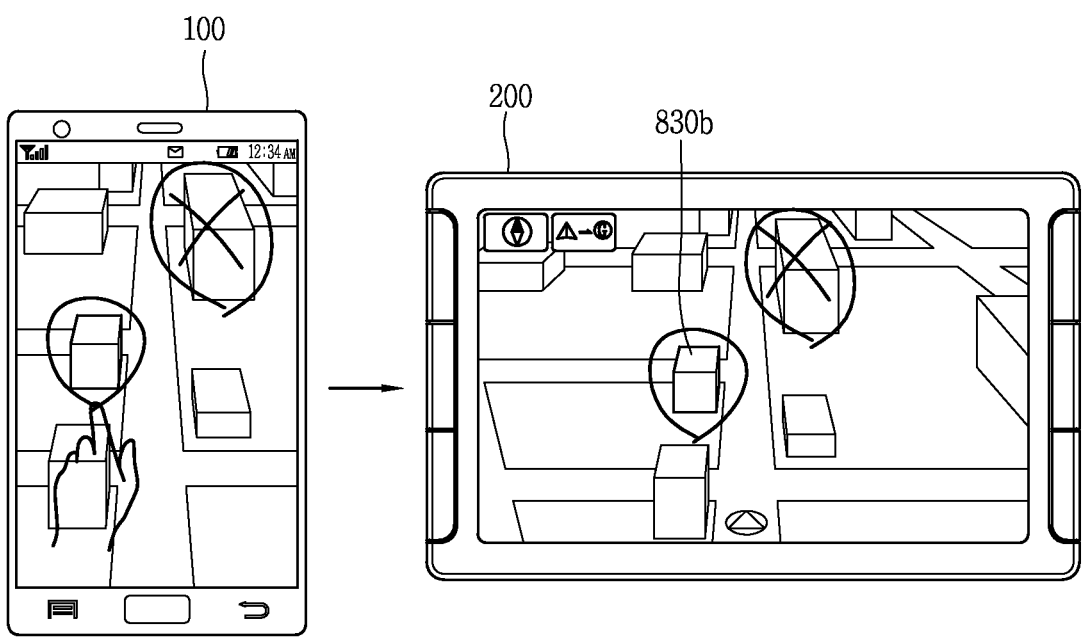

If the user of the external device 100 wants to recommend another location 830*a* as a destination, as illustrated in FIG. 8C, the user may draw a line in the shape of 'O' on the location 830*a* through a touch input. Information related to the drawn line is transmitted to the image display apparatus 200 and thus the line in the shape of 'O' is also drawn on the same location 830*b* of the image display apparatus 200. The controller 212 then recognizes that the location 830*b* with the 'O-shaped' line has been "selected."

Figure 8D:
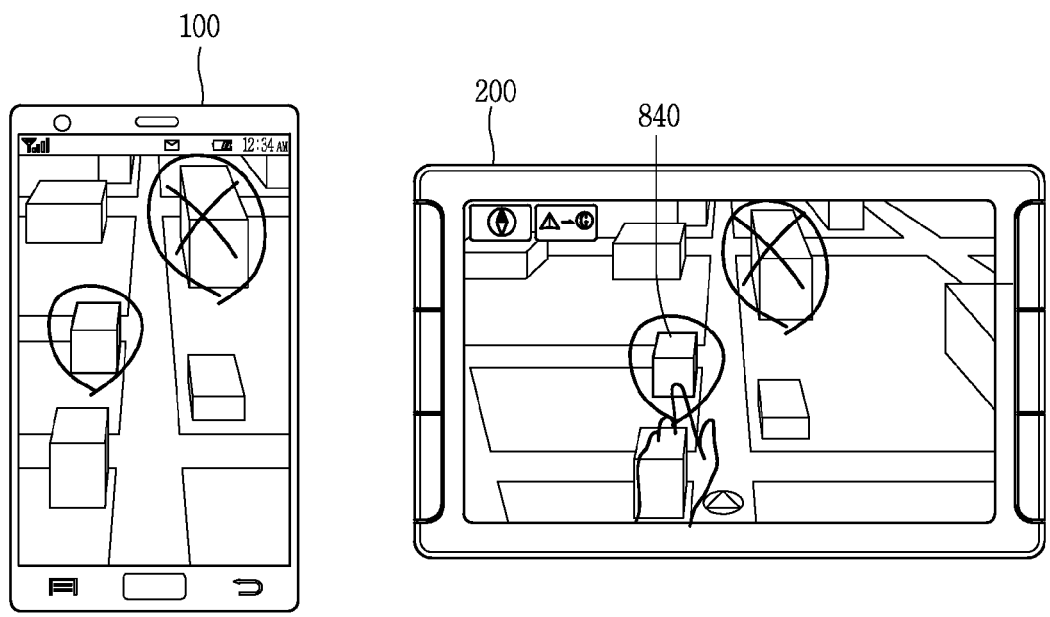

When the driver approves that the selected location 830*b* is set as the destination, as illustrated in FIG. 8D, the corresponding location may be touched (840) (or a specific key of a popped-up menu may be selected) to approve the setting as the destination. The controller 212 thus sets or changes the corresponding location 830*b* as the destination/waypoint according to the driver's approval, so as to generate road guide information.

Figure 8E:
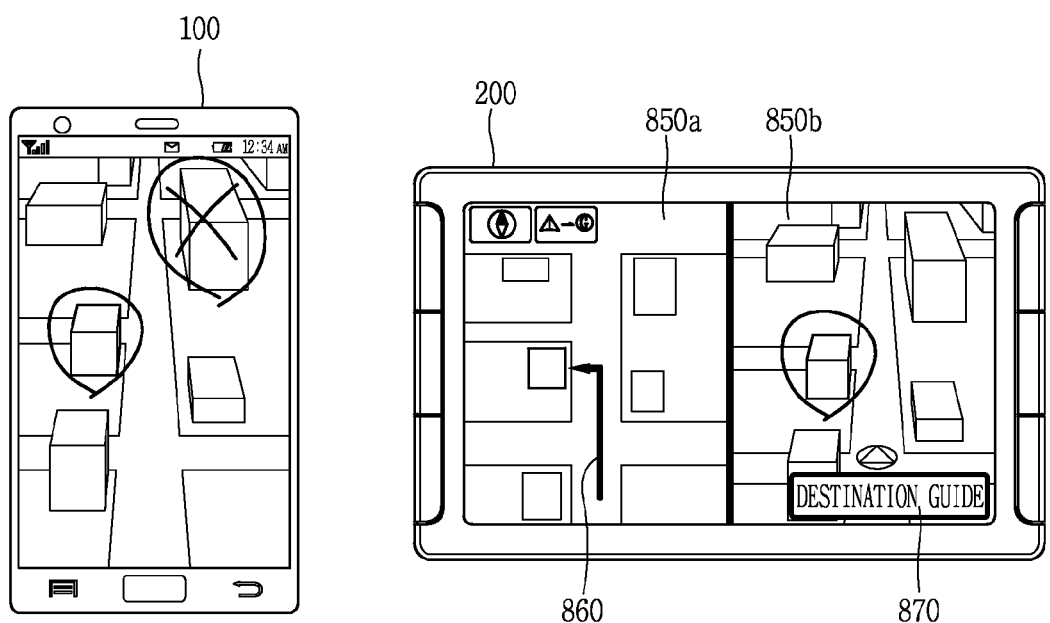

Here, the generated road guide information, as illustrated in FIG. 8E, may be output on a first area (e.g., a divided area or an exclusive area) 850*a* of the display unit 201, or output along with additional information data. Also, a travel route 860 corresponding to the generated road guide information may be output when a touch input is applied to an interface 870 output on one area of the display unit 201, for example, a 'destination guide' key 870.

Meanwhile, the controller 212 may output only the corresponding location 830*b* and surroundings of the location 830*b* in an enlarging manner on the map drawing 850*b* output on a second area of the display unit 201. Also, this change information may equally be applied even to the external device 100.

As described above, the image display apparatus according to the embodiment of the present invention can share map data with an accessed external device and also set or change a destination/waypoint of a vehicle by transmitting and receiving a shape or figure drawn along a touch applied to the map data, thereby providing an intuitive interface to the user.

Hereinafter, description will be given of an operating method of the image display apparatus 200 for setting or changing a travel path (a driving path or a travel route) of a vehicle according to a touch input by sharing map data with an external device 100 connected with the image display apparatus 200, with reference to FIG. 9.

Figure 9:
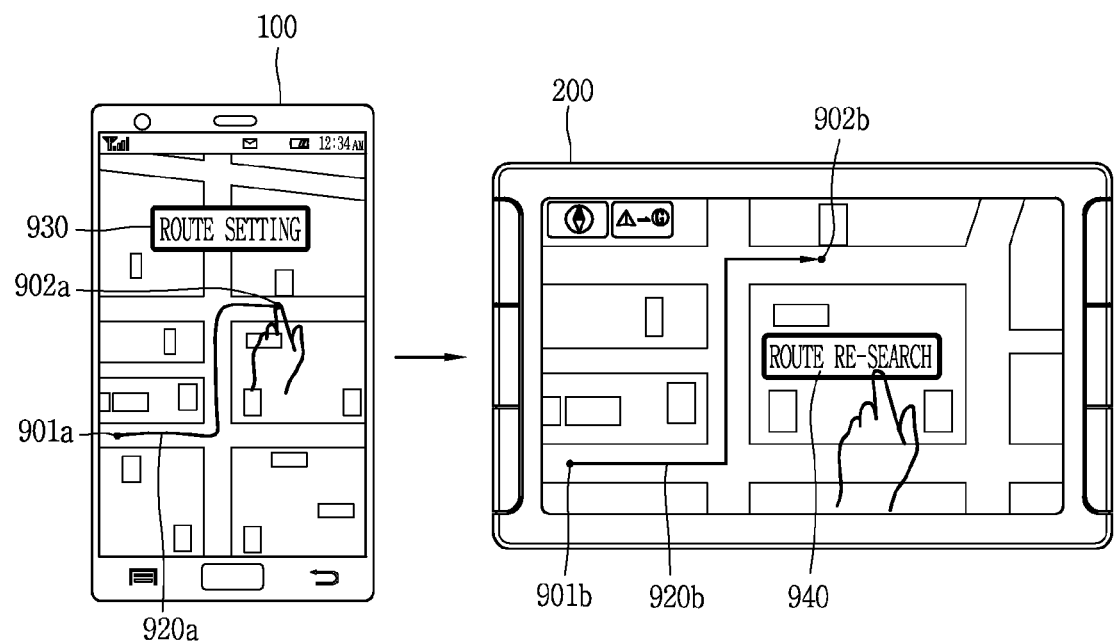
FIG. 9 is a conceptual view illustrating an operating method of an image display apparatus for sharing map data with a connected external device and changing and searching for a driving path (or a travel route) according to a touch applied to the map data, in accordance with one exemplary embodiment of the present invention.

FIG. 9 is a conceptual view illustrating an operating method of an image display apparatus for sharing map data with an accessed external device and changing and searching for a driving path according to a touch applied to the map data, in accordance with one exemplary embodiment of the present invention.

The controller 212 of the image display apparatus 200 transmits a request message to an external device 100 connected therewith to share a first map screen. Upon receiving a response message to the request message from the connected external device 100, the controller 212 may transmit the first map screen to the connected external device 100 through the wireless communication module 206, thereby sharing the first map screen with the connected external device 100.

Here, examples of the electronic device 100 may include cellular phones, smart phones, laptop computers, digital broadcast terminals, personal digital assistants (PDAs), portable multimedia players (PMPs), navigators, slate PCs, tablet PCs, ultra books, fixed terminals (e.g., a display fixed to a rear seat of a vehicle), servers or PCs of service centers (not illustrated) and the like.

Here, when the external device 100 is a server or PC of a service center (not illustrated), the server or PC of the service center and the image display apparatus 200 can be connected to each other in a manner that the image display apparatus 200 mirrored with a terminal within the vehicle or the image display apparatus 200 having a call function may connect a call to the corresponding service center. In this instance, when the driver requests the service center to guide the travel path through the connected image display apparatus 200 (the driver can request for the guide through a voice or a touch input applied to the map information), an operator of the corresponding service center (not illustrated) may perform a guide service using map information transmitted from the image display apparatus 200 through processes to be explained hereinafter.

Meanwhile, the sharing of the first map screen output on the image display apparatus 200 has been exemplarily illustrated, but another embodiment may illustrate the sharing of a second map screen output on the connected external device 100 with the image display apparatus 200. When the second map screen is shared, the controller 212 may scale or resize the transmitted second map screen in order to output the second map screen on the display unit 201.

When information related to a line drawn along a first touch input applied to a first location of the first map screen is received from the connected external device 100, the controller 212 may output the line on the first location of the first map screen.

For example, as illustrated in FIG. 9, when information related to a line 920a drawn along a touch input applied to a screen of the connected external device (e.g., mobile terminal) 100 is transmitted to the image display apparatus (e.g., navigator) 200, "the same or like" line 920b is also output on the display unit 201. Here, the information related to the line may include drawn location, shape, thickness, color and the like of the line.

When the line drawn along the touch input is connected from a current location 901a of the vehicle to a point corresponding to the first location 902a, the image display apparatus (e.g., navigator) 200 receives information related to the line.

When the line information is received, the image display apparatus 200 searches for road guide information, in which a road matched by the line connected from the current location 901a of the vehicle to the point 902b corresponding to the first location is indicated as a travel route, based on a predetermined control signal.

To this end, a 'path setting' key may be output on the screen of the connected external device 100. When a touch input is sensed on the corresponding key, a road that matches the line may be output as the travel route on the image display apparatus 200. Also, when a touch input is applied to 'route re-search' output on the display unit 201, the image display apparatus 200 may change a road that matches the line as a travel route.

Meanwhile, when the line drawn along the touch input is out of a road on the connected external device 100, a travel route that matches the line may be the closest road. In this instance, the line drawn on the external device 100 and the travel route output on the image display apparatus 200 may not always match each other.

As described above, the image display apparatus according to the embodiment of the present invention can share map data with the accessed external device and provide a travel route of the vehicle by transmitting and receiving a shape or figure drawn by a touch applied to the map data, thereby providing an intuitive interface to the user and increasing user convenience.

Hereinafter, description will be given of an operating method of the image display apparatus 200 for setting a destination/waypoint according to a touch input applied to map data and/or changing a travel route of a vehicle according to a touch, by using different map data from a connected external device 100, with reference to FIGS. 10A and 10B.

Figure 10A:
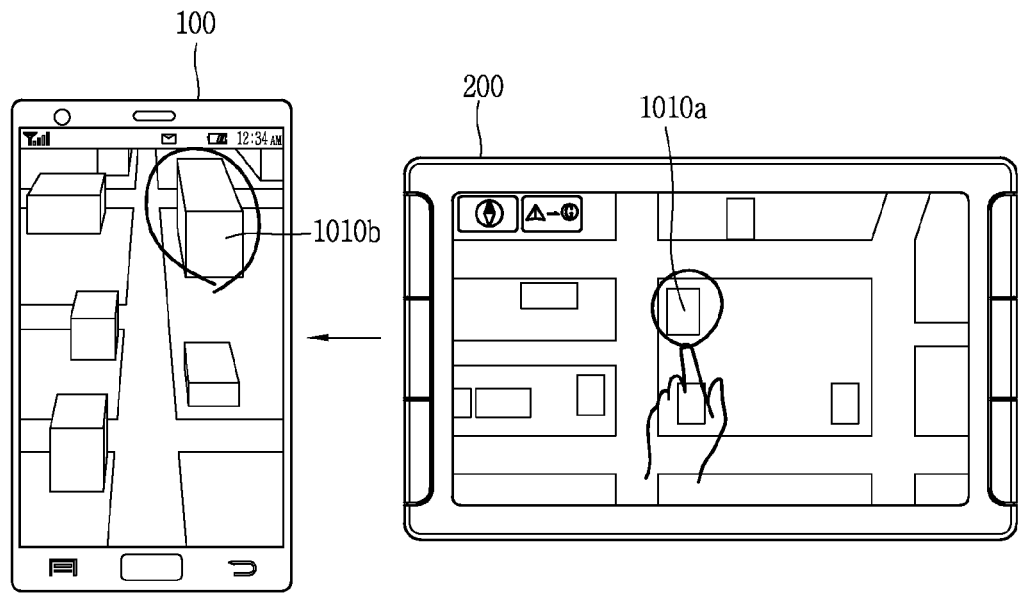
FIG. 10A is a conceptual view illustrating an operating method of an image display apparatus for setting or changing a destination/waypoint according to a touch applied to map data in a manner of using different map data from a connected external device, in accordance with one exemplary embodiment of the present invention.

With regard to this, FIG. 10A is a conceptual view illustrating an operating method of an image display apparatus for setting a destination/waypoint according to a touch input applied to map data, which is different from map data of a connected external device. Also, FIG. 10B is a conceptual view illustrating an operating method of an image display apparatus for changing and searching for a travel route according to a touch applied to map data, which is different from map data of a connected external device.

First, the controller 212 of the image display apparatus 200 outputs a first map screen on the display unit 201. Here, the first map screen may be a map prestored in the memory 213 of the image display apparatus 200, or an image captured through an external camera. Also, the first map screen may be a map or image downloaded from another server which is accessed by executing a predetermined application.

The image display apparatus 200 may access an external device 100 and receive location data, which is selected in response to a touch input applied to a second map screen (in this instance, a touch input applied to a location recognized through a voice command may be included), from the accessed external device 100 through the wireless communication module 206. Here, the second map screen is map data which is different from the first map screen, for example, may be a map prestored in the memory 160 of the external device 100 or a map or image downloaded from another server which is accessed by executing an application.

Each of the image display apparatus 200 and the accessed external device 100 may access a predetermined server (e.g., a relay server) by executing a map application in order to perform processes to be explained hereinafter.

When location data which is selected in response to a touch input applied to the second map screen is received from the accessed external device 100, the controller 212 of the image display apparatus 200 may determine a geographical location corresponding to the received location data.

In detail, the determination of the geographical location may be carried out by using metadata included in the selected location data, for example, GPS information including the latitude and the longitude of the corresponding location, POI information, an address, a phone number and the like.

For example, when a POI that matches the received location data is present in the memory 213 of the image display apparatus 200, the controller 212 may determine the matched POI as the geographical location. On the other hand, when the matched POI with the received location data is not present, the controller 212 may determine a location estimated based on the GPS information included in the location data, for example, the closest road or a POI location as the geographical location.

When the geographical location is determined, the controller 212 may calculate coordinate values of the determined geographical location, and output on the first map screen a line drawn along a touch input applied to a location corresponding to the calculated coordinate values.

Here, the coordinate values of the geographical location may refer to X and Y coordinates of a location corresponding to the determined geographical location on the first map screen output on the display unit 201. Here, the touch input may be a preset touch & drag. The line may be drawn based on information related to a line received from the accessed external device 100, for example, based on drawn location, shape, thickness, color and the like of the line. Also, the line drawing along the touch input is carried out in real time and implemented almost simultaneously on the external device 100 and the image display apparatus 200 except for a transmission time.

In order to output the calculated coordinate values on the first map screen, the controller 212 may perform a map scaling operation and/or a map radius detecting operation, in addition to the GPS information and the POI information.

In order to recognize how far the location corresponding to the calculated coordinate values is present from a center of the output map information, the controller 212 may calculate a spaced distance between a center of a detected radius of the map and the location corresponding to the calculated coordinate values.

Meanwhile, when a predetermined line is drawn at a specific location in response to a touch input applied to the first map screen output on the display unit 201 of the image display apparatus 200, the image display apparatus 200 outputs the line on the display unit 201 and transmits data of the specific location and the line information to the accessed external device 100.

With regard to this, referring to FIG. 10A, when a line in a shape of 'O' is drawn at a first location 1010a of the first map screen output on the display unit 201 of the image display apparatus 200, the image display apparatus 200 transmits information related to the drawn line and information related to the first location 1010a to the accessed external device 100. Accordingly, the accessed external device 100 outputs the line in the shape of 'O' on a second location 1010b corresponding to the first location 1010a by performing processes to be explained hereinafter. Meanwhile, the controller 212 of the image display apparatus 200 recognizes the line in the shape of 'O' as a selection of maintaining a destination/waypoint.

Upon receiving data of the specific location selected according to the touch input and the line information, the external device 100 determines a geographical location corresponding to the received location data, similar to the aforementioned, and outputs the line on the second map screen based on the received line information. Here, the line drawing along the touch input is carried out in real time, and thus is implemented almost simultaneously on the external device 100 and the image display apparatus 200 except for a transmission time.

When the line output on the image display apparatus 200 is in a first shape, for example, a shape of 'O,' the controller 212 may output on the display unit 201 an interface for selecting the geographical location corresponding to the line-drawn location as one of the destination and the waypoint.

When the line output on the image display apparatus 200 according to the touch input is connected from a current location of the vehicle to a point corresponding to the specific location, the controller 212 may search for road guide information, in which a road that matches the line connected from the current location of the vehicle to the point corresponding to the specific location is indicated (or guided) as a travel route, based on a predetermined control signal.

Figure 10B:
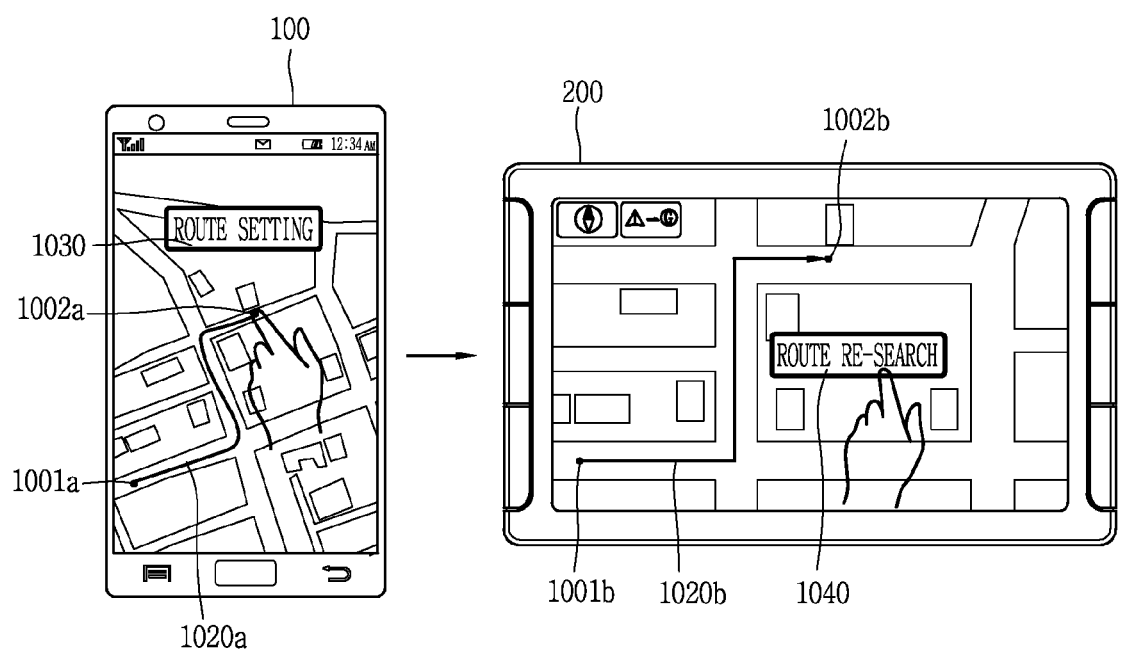
FIG. 10B is a conceptual view illustrating an operating method of an image display apparatus for changing a driving path according to a touch applied to map data in a manner of using different map data from a connected external device, in accordance with one exemplary embodiment of the present invention.

With regard to this, referring to FIG. 10B, when information related to a line 1020a, which is drawn along a touch input applied to the screen of the accessed external device (e.g., mobile terminal) 100, is transmitted to the image display apparatus (e.g., navigator) 200, the image display apparatus 200 searches for a road that matches the line 1020a and outputs a line 1020b in a 'corresponding' shape on the display unit 201. On the other hand, when a matched road is not searched for, the controller 212 may control the line 1020b to be output on the closest road at a location estimated based on metadata included in the received information related to the line 1020a.

When the line output on the image display apparatus 200 is in a second shape, for example, a shape of 'X,' the controller 212 may cancel the selection/setting that the geographical location corresponding to the line-drawn location is the destination or waypoint.

In the meantime, in order to set a destination/waypoint of a vehicle or change a travel route according to a line drawn along a touch input, the driver should input an indication of "approval" through the image display apparatus 200. The indication of the approval may be carried out by manipulating a key button provided on the image display apparatus 200 or output on the display unit 201 or inputting a driver's voice command through a voice recognition module 301.

For example, as illustrated in FIG. 10B, when a touch input is applied to a 'route setting' key 1030 output on a screen of the accessed external device 100, the image display apparatus 200 may output the line-matched road as the travel route. Also, when a 'route re-search' key 1040 is output on the display unit 201 of the image display apparatus 200 and a touch input is applied to the key 1040, the controller 212 may change the travel route to the line-matched road.

Figure 11:
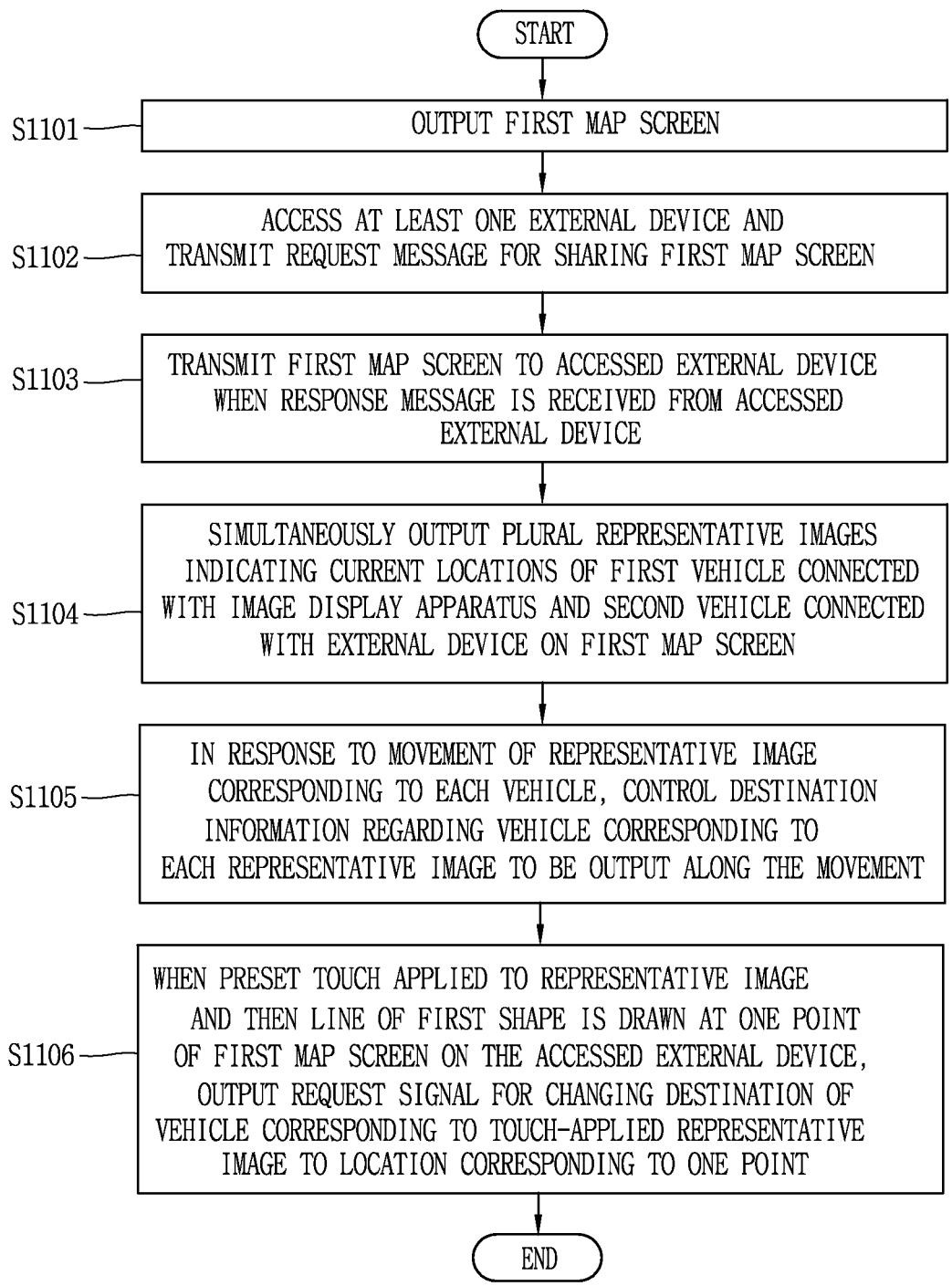
FIG. 11 is a flowchart illustrating an operating method of an image display apparatus in accordance with one exemplary embodiment of the present invention.

Hereinafter, FIG. 11 is a flowchart illustrating an operating method of an image display apparatus in accordance with one exemplary embodiment of the present invention. (a) to (d) of FIGS. 12 and 13 are conceptual views illustrating the flowchart of FIG. 11.

First, the image display apparatus 200 according to the embodiment of the present invention may output a first map screen on the display unit 201 (S1101). Here, the first map screen, as aforementioned, may be a map prestored in the memory 213 of the image display apparatus 200, an image captured through an external camera, or a map or image downloaded from another server which is accessed by executing an application.

Continuously, the image display apparatus 200 may access at least one external device 100 to transmit a request message for sharing the first map screen (S1102). When a response message is received from the accessed external device 100, the image display apparatus 200 may transmit the first map screen to the accessed external device 100 (S1103). Accordingly, the image display apparatus 200 and the external device 100 connected to each other may share the same map data, namely, the first map screen.

Figure 12:
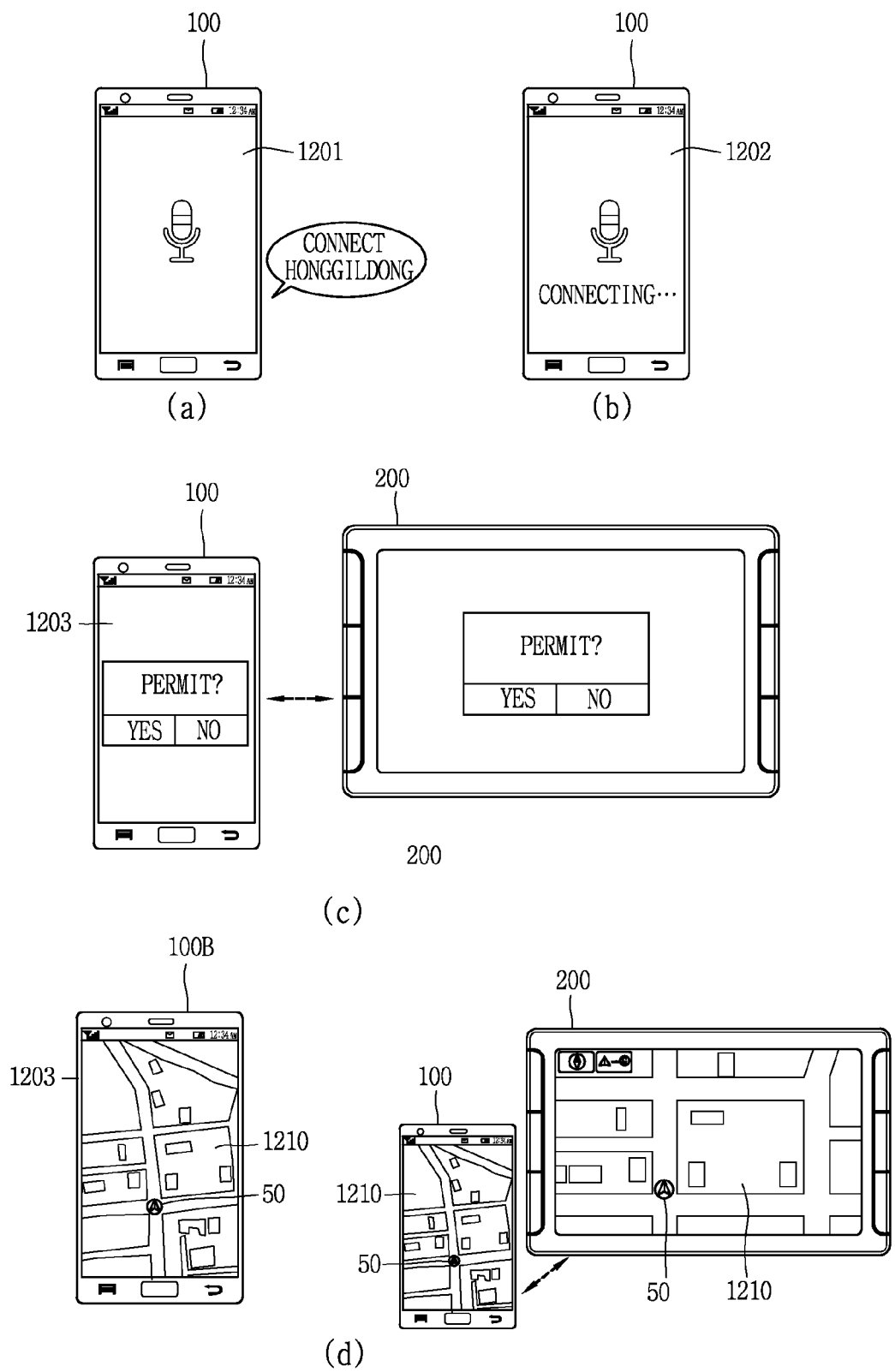
FIGS. 12 and 13 are conceptual views illustrating the flowchart of FIG. 11.
Figure 13:
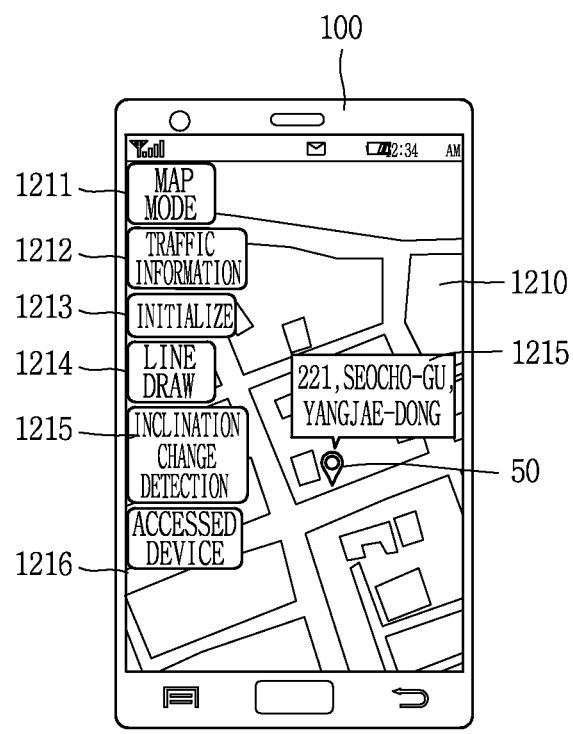

For example, (a) to (d) of FIG. 12 illustrate an exemplary procedure in which the image display apparatus 200 and at least one external device 100 are connected to each other and share the same map screen. First, while a screen 1201 corresponding to an execution of a voice recognition function is output on a mobile terminal 100, when a preset voice command (e.g., 'connect a view talk with Honggildong) is input, the mobile terminal 100 attempts to access the image display apparatus 200 whose name (e.g., 'Honggildong) prestored in a phonebook matches the input voice command ((a) of FIG. 12). The display unit 151 of the mobile terminal 100, as illustrated in (b) of FIG. 12, outputs a screen 1202 indicating that an access request is ongoing.

Afterwards, each display of the image display apparatus 200 and the mobile terminal 100 may output a message of requesting for the access ((c) of FIG. 12). On the other hand, although not illustrated, the message may be output in the form of voice requesting for the access, taking into account of the driver's safety. When a response of permitting the access is input from each user of the image display apparatus 200 and mobile terminal 100, as illustrated in (d) of FIG. 12, a map screen transmitted from the mobile terminal 100 which has requested for the access is output on the image display apparatus 200 and the mobile terminal 100, respectively. That is, the image display apparatus 200 and the mobile terminal 100 share the same map screen with each other. Also, each of map screens which are output on the image display apparatus 200, the mobile terminal 100 and another external device 1008 outputs thereon a thumbnail image 50 indicating a current location of a corresponding vehicle.

Meanwhile, FIG. 13 illustrates a shared map screen output on the display unit 151 of the mobile terminal 100 which is currently in a connected state with the image display apparatus 200 according to the embodiment of the present invention. The shared map screen may include various interfaces for user manipulation, as illustrated in FIG. 13.

For example, a plurality of icons 1211, 1212, 1213, 1214 1215 and 1216 for executing various functions associated with the shared map screen may be output on one area, for example, a left area of the shared map screen 1210, output on the display unit 151.

In detail, the icons may include a first icon 1211 for changing a display mode (e.g., a photo or another image) of the shared map screen, a second icon 1212 for applying current traffic information to the map screen in real time, and a third icon 1213 for deleting full histories output on the shared map screen. In addition, the icons may include a fourth icon 1214 for turning on/off an input of a touch line for setting a destination or a route (path) on the shared map screen 1210, a fifth icon 1215 for turning on/off a function of changing an output range of the shared map screen 1210 by sensing an inclination (tilt) change of the mobile terminal 100, and a sixth icon 1216 for outputting identification information related to an accessed external device, such as the accessed image display apparatus 200, and an accessible external device on the screen.

In this manner, when the first map screen is shared by the image display apparatus 200 and the mobile terminal 100, current locations of vehicles corresponding to the image display apparatus 200 and the mobile terminal 100 may be output on the first map screen, respectively.

In detail, the controller 212 may output a plurality of representative images indicating current locations of a first vehicle connected with the image display apparatus 200 and a second vehicle connected with the accessed external device 100, simultaneously on the first map screen (S1104). Accordingly, the current locations and moving paths of the vehicles corresponding to the image display apparatus 200 and the external device 100 which are currently communicating with each other can be simultaneously checked on one screen.

Here, the plurality of representative images may be thumbnail images including identification information related to the respective vehicles, respectively. Also, the representative image may be generated or changed through a preset user input.

For example, still referring to FIG. 13, a thumbnail image 50 of a vehicle indicating a current location of the vehicle is output on the shared map screen 1210. The thumbnail image 50 is moved and displayed on the shared map screen 1210 along an actual travel route of the vehicle. An image (e.g., a speech bubble) 1215 including destination information related to the vehicle corresponding to the thumbnail image 50 may be output in the vicinity of the thumbnail image 50 and moved by being close together with the thumbnail image 50.

The controller 212 may control the destination information related to the vehicle corresponding to each representative image to be output along the movement of the representative image, while the representative image corresponding to each vehicle is moved on the first map screen along the travel of the vehicle (S1105).

When a preset touch is applied to the representative image on the accessed external device 100 and a first shape of line is drawn at one point of the first map screen, the controller 212 may control a request signal, which is provided to change the destination of the vehicle corresponding to the touch-applied representative image to a location corresponding to the one point, to be output on a device connected with the vehicle corresponding to the touch-applied representative image, for example, the image display apparatus 200 or the external device 100.

Also, when a select signal is sensed in response to the request signal, the controller 212 may change the destination of the vehicle corresponding to the touch-applied representative image to the location corresponding to the one point. Accordingly, the changed destination information may be output at the corresponding representative image on the first map screen output on the display unit 201.

The image display apparatus 200 according to the embodiment of the present invention may provide information related to a touch input applied to the first map screen, such that a line drawn along the applied touch input is also output on the first map screen which has been transmitted to the external device 100. Here, the information related to the touch input may include thickness, shape, position and the like of the line (transmitted as it is in real time), and also further include coordinates and geographical location information of a corresponding point when the line is drawn into a preset shape, for example, a closed loop.

For example, when the line drawn along the touch input applied on the first map screen forms one line connected from a first location corresponding to a current location of the vehicle to a second location and thereafter a preset input signal is detected, the controller 212 of the image display apparatus 200 may search for road guide information in which the line formed from the first location to the second location is a travel route. That is, the image display apparatus 200 may provide the coordinates and geographical location information of the first location (touch-started point) and the second location (touch-ended portion) to the image display apparatus 200 and the external device 100 connected with the image display apparatus 200, thereby providing one travel path.

According to the embodiments of the present invention, current locations of a plurality of vehicles and their moving paths can be recognized on one screen at the same time, and moving paths or destinations for the plurality of vehicles can simultaneously be recommended based on a touch input applied to the screen.

The image display apparatus 200 may sense an inclined degree and an inclined direction of the display unit 201 (or a main body), and accordingly change an output range of the first map screen. Also, the image display apparatus 200 may transfer information related to the inclination to the accessed external device 100, and accordingly, the output range of the first map screen output on the accessed external device 100 may also be changed.

Meanwhile, the control operation of changing the output range of the shared map screen according to the inclined degree and the inclined direction may also be performed in the external device 100, for example, the mobile terminal.

Figure 14:
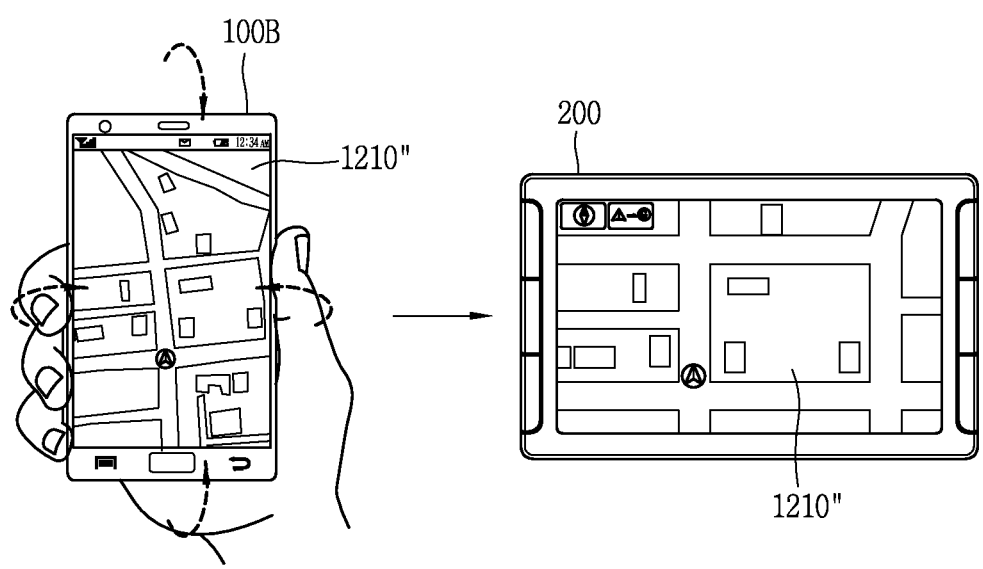
FIG. 14 is a conceptual view illustrating a method of changing an output range of map data according to an inclination variation of a connected external device, in accordance with one exemplary embodiment of the present invention.

With regard to this, FIG. 14 illustrates a method of changing an output range of a shared map screen according to an inclination change of the accessed external device, for example, a mobile terminal 100 while the image display apparatus 200 and the mobile terminal 100 share the one map screen.

As illustrated in (a) of FIG. 14, when the user inclines the mobile terminal 100 to left or right, or up or down, a gyro sensor (not illustrated) of the mobile terminal 100 senses the inclined degree and the inclined direction and transfers the sensed degree and direction. The controller 180 then changes an output range of the first map screen output on the display unit 151 in real time, to be proportional to the degree and the direction corresponding to the transferred sensed values (1210"). The change information, as illustrated in (b) of FIG. 14, provides to the accessed image display apparatus 200. Accordingly, the first map screen 1210" with the changed output range is also output on the display unit 201 of the image display apparatus 200. Although not illustrated, an image (e.g., a compass image) indicating the degree and the direction corresponding to the transferred sensed values may be output on each display of the image display apparatus 200 and the mobile terminal 100.

As described above, in an image display apparatus and an operating method thereof according to embodiments of the present invention, when a destination/waypoint or a travel route of a vehicle is provided through an external device connected with the image display apparatus, the destination/waypoint or the travel route can be set or re-searched for merely by a driver's approval. This may allow for fast searching for the destination/waypoint or travel route without an interference with the driving of the driver. By sharing map data with the external device connected with the image display apparatus or using different map data from the connected external device, a shape or pattern drawn along a touch applied to the corresponding map data can be transmitted and received to set or change the destination/waypoint or the travel route of the vehicle, thereby providing intuitive interfaces to a user. Also, current locations and moving paths of a plurality of vehicles can be simultaneously recognized on one screen, and the moving paths or destinations of the plurality of vehicles can simultaneously be recommended based on a touch input applied to the screen.

The aforementioned method according to one embodiment of the present invention can be implemented as processor-readable codes in a program-recorded medium. Examples of such processor-readable media may include ROM, RAM, CD-ROM, magnetic tape, floppy disk, optical data storage element and the like. Also, the processor-readable medium may also be implemented as a format of carrier wave (e.g., transmission via an Internet). Therefore, it should also be understood that the above-described image display apparatus and the operating method thereof are not limited by any of the configurations and methods of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

The invention claimed is:

1. An image display apparatus for a vehicle, the image display apparatus comprising:
a display configured to display a first map screen;
a wireless communication unit configured to receive a location selected from a second map screen displayed on an external mobile terminal; and
a controller configured to:
display coordinate information on the first map screen that is associated with coordinate values of the location selected on the second map screen,
output a request signal for setting the coordinate information as a one of destination and a waypoint of the vehicle,
transmit information related to a touch input applied to the first map screen such that a line drawn along the touch input is also displayed on the second map screen of the external mobile terminal, and
transmit information related to an inclination applied to the display, to change an output range of the first map screen according to a degree and direction of the inclination.

2. The apparatus of claim 1, wherein the controller is further configured to:
display road guide information on the first map screen including the coordinate information as one of the destination and the waypoint in response to a select signal responsive to the request signal.

3. The apparatus of claim 1, further comprising:
a memory configured to store map data,
wherein the controller is further configured to:
search the memory for a point of interest (POI) that matches the coordinate values of the location selected on the second map screen, and
display the coordinate information as a POI on the first map screen in response to the memory including the POI that matches the coordinate values of the location selected on the second map screen.

4. The apparatus of claim 3, wherein the controller is further configured to:

display an estimated location as the coordinate information on the first map screen in response to the memory not including the POI that matches the coordinate values of the location selected on the second map, the estimated location being obtained based on global positioning system (GPS) information.

5. The apparatus of claim 1, wherein the controller is further configured to:
transmit a request message via the wireless communication unit for sharing the first map screen to the external mobile terminal, and
transmit data via the wireless communication unit of the first map screen to the external mobile terminal such that the external mobile terminal displays the second map screen corresponding to the first map screen in response to an acknowledgement signal being received from the external mobile terminal for sharing the first map screen.

6. The apparatus of claim 5, wherein the controller is further configured to:
display a first line drawn on the display around at least one location displayed on the first map screen,
transmit, via the wireless communication unit, the data including information about the first line to the external mobile terminal so the external mobile terminal can display a corresponding first line on the second map screen,
receive, via the wireless communication unit, data from the external mobile terminal including a second line drawn on the second map screen indicating a rejection of the at least one location identified by the first line and a third line drawn on the second map screen indicating another location displayed on the second map,
display a corresponding third line drawn around the other location on the first screen map in response to receiving the data from the external mobile terminal including the second line drawn and the third line drawn on the second map screen, and
display a road guide on the first screen map to the other location indicated by the third line drawn on the second map screen of the external mobile terminal.

7. The apparatus of claim 1, wherein the controller is further configured to:
receive, via the wireless communication unit, motion information related to the first map from the external mobile terminal, and
change an output range of the first map screen on the display to correspond to the received motion information.

8. The apparatus of claim 1, wherein the controller is further configured to:
in response to a line drawn along the touch input from a first location corresponding to a current location of the vehicle to a second location and thereafter a preset input signal being detected, search for road guide information based on the line from the first location to the second location as a travel route.

9. The apparatus of claim 1, wherein the controller is further configured to:
in response to the line drawn along the touch input having a first shape, select a location corresponding to a drawn point of the line, and
in response to a line of a second shape being drawn along the touch input at the drawn point of the line with the first shape, deselect the location corresponding to the drawn point of the line.

10. The apparatus of claim 9, wherein the controller is further configured to:
display road guide information with the selected location in response to the selection of the location, and
change the road guide information to a previously-set destination or waypoint in response to the deselection of the location.

11. The apparatus of claim 9, wherein the controller is further configured to:
display a plurality of representative images on the first map screen indicating current locations of the vehicle with the image display apparatus and another vehicle connected with the external mobile terminal, and
display destination information related for each vehicle, along a movement of the each vehicle.

12. The apparatus of claim 11, wherein the controller is further configured to:
in response to a preset touch being applied to a representative image and a line of a first shape being drawn at one point of the first map screen, output a request signal for changing a destination of the vehicle corresponding to the touch-applied representative image into a location corresponding to the one point of the first map screen.

13. The apparatus of claim 12, wherein the controller is further configured to:
in response to a select signal responsive to the request signal, change the destination of the vehicle corresponding to the touch-applied representative image to the location corresponding to the one point, and display the changed destination information at the corresponding representative image.

14. A method of controlling an image display apparatus for a vehicle, the method comprising:
displaying, via a display of the image display apparatus, a first map screen;
receiving, via a wireless communication unit of the image display apparatus, a location selected from a second map screen displayed on an external mobile terminal;
displaying, via the display, coordinate information on the first map screen that is associated with coordinate values of the location selected on the second map screen;
outputting, via the wireless communication unit, a request signal for setting the coordinate information as a one of destination and a waypoint of the vehicle;
transmitting information related to a touch input applied to the first map screen such that a line drawn along the touch input is also displayed on the second map screen of the external mobile terminal; and
transmitting information related to an inclination applied to the display, to change an output range of the first map screen according to a degree and direction of the inclination.

15. The method of claim 14, further comprising:
displaying road guide information on the first map screen including the coordinate information as one of the destination and the waypoint in response to a select signal responsive to the request signal.

16. The method of claim 14, further comprising:
storing, via a memory of the image display apparatus, map data;
searching, via a controller of the image display apparatus, the memory for a point of interest (POI) that matches the coordinate values of the location selected on the second map screen; and displaying the coordinate information as a POI on the first map screen in response to the memory including the POI that matches the coordinate values of the location selected on the second map screen.

17. The method of claim 16, further comprising:

displaying an estimated location as the coordinate information on the first map screen in response to the memory not including the POI that matches the coordinate values of the location selected on the second map, the estimated location being obtained based on global positioning system (GPS) information.

18. The method of claim 14, further comprising:

transmitting a request message via the wireless communication unit for sharing the first map screen to the external mobile terminal; and transmitting data via the wireless communication unit of the first map screen to the external mobile terminal such that the external mobile terminal displays the second map screen corresponding to the first map screen in response to an acknowledgement signal being received from the external mobile terminal for sharing the first map screen.

19. The method of claim 18, further comprising:

displaying a first line drawn on the display around at least one location displayed on the first map screen;

transmitting, via the wireless communication unit, the data including information about the first line to the external mobile terminal so the external mobile terminal can display a corresponding first line on the second map screen;

receiving, via the wireless communication unit, data from the external mobile terminal including a second line drawn on the second map screen indicating a rejection of the at least one location identified by the first line and a third line drawn on the second map screen indicating another location displayed on the second map;

displaying a corresponding third line drawn around the other location on the first screen map in response to receiving the data from the external mobile terminal including the second line drawn and the third line drawn on the second map screen; and displaying a road guide on the first screen map to the other location indicated by the third line drawn on the second map screen of the external mobile terminal.

* * * * *